United States Patent
Umehara et al.

(10) Patent No.: US 10,712,177 B2
(45) Date of Patent: Jul. 14, 2020

(54) POSITION DETECTION DEVICE

(71) Applicant: TDK CORPORATION, Tokyo (JP)

(72) Inventors: Tsuyoshi Umehara, Tokyo (JP);
Hayato Miyashita, Tokyo (JP);
Keisuke Uchida, Tokyo (JP); Hiraku Hirabayashi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 126 days.

(21) Appl. No.: 16/117,778

(22) Filed: Aug. 30, 2018

(65) Prior Publication Data
US 2019/0128698 A1    May 2, 2019

(30) Foreign Application Priority Data
Oct. 31, 2017    (JP) .................. 2017-210250

(51) Int. Cl.
| | | |
|---|---|---|
| *G01R 33/09* | (2006.01) | |
| *G01D 5/12* | (2006.01) | |
| *G01D 5/16* | (2006.01) | |
| *G03B 3/00* | (2006.01) | |
| *G03B 5/00* | (2006.01) | |
| *G02B 7/00* | (2006.01) | |
| *G01D 5/14* | (2006.01) | |

(52) U.S. Cl.
CPC .............. *G01D 5/16* (2013.01); *G01D 5/145* (2013.01); *G02B 7/00* (2013.01); *G03B 3/00* (2013.01); *G03B 5/00* (2013.01)

(58) Field of Classification Search
CPC .............................................. G01R 33/0017; G01R 33/0206; G01R 33/09; G01R 33/091; G01R 33/098; G01R 33/093; G01R 33/072; G01D 5/12; G01D 5/16; G01D 5/145; G01D 5/202; G01D 5/2046
See application file for complete search history.

(56) References Cited

U.S. PATENT DOCUMENTS

| | | | |
|---|---|---|---|
| 8,604,780 B2 * | 12/2013 | Saruki .................. | G01D 5/145 |
| | | | 324/207.12 |
| 2007/0047152 A1 | 3/2007 | Furukawa et al. | |
| 2016/0231528 A1 | 8/2016 | Wong et al. | |
| 2018/0274945 A1 * | 9/2018 | Uchida .................. | G01D 5/145 |

FOREIGN PATENT DOCUMENTS

JP    2016-223894 A    12/2016

* cited by examiner

*Primary Examiner* — Minh N Tang
(74) *Attorney, Agent, or Firm* — Oliff PLC

(57) ABSTRACT

A position detection device includes a first position detector, a second position detector, and a signal generator. The first position detector includes a first magnetic field generation unit, a second magnetic field generation unit, and a first magnetic sensor. The second position detector includes a third magnetic field generation unit, a fourth magnetic field generation unit, and a second magnetic sensor. The positions of the second and fourth magnetic field generation units vary in response to variations in a detection-target position. The signal generator generates a position detection signal, which is the sum of a first detection signal generated by the first magnetic sensor and a second detection signal generated by the second magnetic sensor. Each of the first and second position detectors includes a bias magnetic field generation unit.

10 Claims, 17 Drawing Sheets

POSITION DETECTION DEVICE

BACKGROUND OF THE INVENTION

1. Field of the Invention

The present invention relates to a position detection device that uses a magnetic sensor.

2. Description of the Related Art

Position detection devices using magnetic sensors have been used for a variety of applications. The position detection devices using magnetic sensors will hereinafter be referred to as magnetic position detection devices. For example, the magnetic position detection devices are used for detecting a lens position in a camera module having an autofocus mechanism incorporated in a smartphone.

US 2016/0231528 A1 discloses a technique of detecting a composite vector with a position sensor in an autofocus mechanism in which a lens is movably coupled to a substrate. The composite vector is generated by interaction between a first magnetic field having a constant strength in a first direction and a second magnetic field in a second direction generated by a magnet that moves with the lens. The second direction is orthogonal to the first direction. According to the technique, the magnitude of the second magnetic field varies depending on the lens position, and as a result, the angle that the composite vector forms with the second direction, which will hereinafter be referred to as the composite vector angle, also varies.

US 2007/0047152 A1 discloses a magnetic field detection apparatus that uses a magnetoresistive element of spin valve structure. This apparatus includes a bias unit for applying a bias magnetic field to the magnetoresistive element to change the characteristic of a resistance value of the magnetoresistive element to an external magnetic field.

According to the technique disclosed in US 2016/0231528 A1, it is possible to detect the lens position by detecting the composite vector angle.

According to the technique disclosed in US 2016/0231528 A1, if the position sensor is subjected to a noise magnetic field other than the first and second magnetic fields, there occurs a change in the composite vector angle, which disadvantageously results in an error in a detection value for the lens position.

SUMMARY OF THE INVENTION

It is an object of the present invention to provide a position detection device that uses a magnetic sensor and is capable of performing position detection with high accuracy even when subjected to a noise magnetic field.

A position detection device of the present invention is a device for detecting a detection-target position that varies within a predetermined movable range. The position detection device of the present invention includes a first position detector, a second position detector, and a signal generator for generating a position detection signal corresponding to the detection-target position.

The first position detector includes a first magnetic field generation unit for generating a first magnetic field, a second magnetic field generation unit for generating a second magnetic field, and a first magnetic sensor. The second position detector includes a third magnetic field generation unit for generating a third magnetic field, a fourth magnetic field generation unit for generating a fourth magnetic field, and a second magnetic sensor.

The first magnetic sensor is configured to detect, at a first detection position in a first reference plane, a first detection-target magnetic field and to generate a first detection signal that varies in magnitude according to the direction of the first detection-target magnetic field, wherein the first detection-target magnetic field is a magnetic field component parallel to the first reference plane. The second magnetic sensor is configured to detect, at a second detection position in a second reference plane, a second detection-target magnetic field and to generate a second detection signal that varies in magnitude according to the direction of the second detection-target magnetic field, wherein the second detection-target magnetic field is a magnetic field component parallel to the second reference plane. The signal generator generates the sum of the first detection signal and the second detection signal as the position detection signal.

The position of the second magnetic field generation unit relative to the first magnetic field generation unit and the position of the fourth magnetic field generation unit relative to the third magnetic field generation unit vary in response to variations in the detection-target position.

When the detection-target position varies, the strength of a second magnetic field component varies whereas none of the strength and direction of a first magnetic field component and the direction of the second magnetic field component vary, wherein the first magnetic field component is a component of the first magnetic field at the first detection position, the component of the first magnetic field being parallel to the first reference plane, and the second magnetic field component is a component of the second magnetic field at the first detection position, the component of the second magnetic field being parallel to the first reference plane.

When the detection-target position varies, the strength of a fourth magnetic field component varies whereas none of the strength and direction of a third magnetic field component and the direction of the fourth magnetic field component vary, wherein the third magnetic field component is a component of the third magnetic field at the second detection position, the component of the third magnetic field being parallel to the second reference plane, and the fourth magnetic field component is a component of the fourth magnetic field at the second detection position, the component of the fourth magnetic field being parallel to the second reference plane.

The direction of the third magnetic field component is opposite to the direction of the first magnetic field component. The direction of the fourth magnetic field component is opposite to the direction of the second magnetic field component. A variable range of the first detection signal corresponding to the predetermined movable range of the detection-target position includes a first reference value, and a variable range of the second detection signal corresponding to the predetermined movable range of the detection-target position includes a second reference value, wherein the first reference value is an average value of the maximum value and the minimum value of the first detection signal when the direction of the first detection-target magnetic field varies over a range of 360°, and the second reference value is an average value of the maximum value and the minimum value of the second detection signal when the direction of the second detection-target magnetic field varies over the range of 360°.

In the position detection device of the present invention, each of the first magnetic sensor and the second magnetic sensor may include at least one magnetoresistive element.

The at least one magnetoresistive element may include a magnetization pinned layer having a magnetization whose direction is fixed, and a free layer having a magnetization whose direction is variable according to the direction of the first or second detection-target magnetic field. In this case, the first reference plane is a plane that contains the direction of the magnetization of the magnetization pinned layer in the first magnetic sensor and the direction of the first detection-target magnetic field. The direction of the first detection-target magnetic field when the first detection signal is of the first reference value is the same as one of two directions orthogonal to the direction of the magnetization of the magnetization pinned layer in the first magnetic sensor. The second reference plane is a plane that contains the direction of the magnetization of the magnetization pinned layer in the second magnetic sensor and the direction of the second detection-target magnetic field. The direction of the second detection-target magnetic field when the second detection signal is of the second reference value is the same as one of two directions orthogonal to the direction of the magnetization of the magnetization pinned layer in the second magnetic sensor.

In the position detection device of the present invention, a value in the middle of the variable range of the first detection signal may be the first reference value, and a value in the middle of the variable range of the second detection signal may be the second reference value.

In the position detection device of the present invention, at least one of the first position detector and the second position detector may further include a bias magnetic field generation unit for generating a bias magnetic field to be applied to the first or second magnetic sensor. In this case, the bias magnetic field applied to at least one of the first magnetic sensor and the second magnetic sensor causes the variable range of the first detection signal to include the first reference value and causes the variable range of the second detection signal to include the second reference value. In this case, the strength of the second magnetic field component and the strength of the fourth magnetic field component corresponding to the same detection-target position may be different from each other in absolute value.

The first position detector may include, as the bias magnetic field generation unit, a first bias magnetic field generation unit for generating a first bias magnetic field to be applied to the first magnetic sensor, and the second position detector may include, as the bias magnetic field generation unit, a second bias magnetic field generation unit for generating a second bias magnetic field to be applied to the second magnetic sensor. The first bias magnetic field and the second bias magnetic field may be in directions non-parallel to each other.

In the position detection device of the present invention, the first magnetic field generation unit may include a first magnet and a second magnet disposed at different positions. In this case, the first magnetic field may be a composite of two magnetic fields that are respectively generated by the first magnet and the second magnet. The third magnetic field generation unit may include a third magnet and a fourth magnet disposed at different positions. In this case, the third magnetic field may be a composite of two magnetic fields that are respectively generated by the third magnet and the fourth magnet.

The position detection device of the present invention may further include a first holding member for holding the first magnetic field generation unit and the third magnetic field generation unit, and a second holding member for holding the second magnetic field generation unit and the fourth magnetic field generation unit, the second holding member being provided such that its position is variable in one direction relative to the first holding member. In this case, the second holding member may be configured to hold a lens, and may be provided such that its position is variable in a direction of an optical axis of the lens relative to the first holding member.

According to the position detection device of the present invention, the direction of the third magnetic field component is opposite to the direction of the first magnetic field component, and the direction of the fourth magnetic field component is opposite to the direction of the second magnetic field component. On the other hand, a noise magnetic field applied to the first magnetic sensor and a noise magnetic field applied to the second magnetic sensor are in the same direction. Accordingly, when a noise magnetic field is applied to each of the first and second magnetic sensors, one of the first and second detection signals increases whereas the other decreases. Since the present invention uses the sum of the first and second detection signals as the position detection signal, variations in the position detection signal caused by a noise magnetic field are reduced. Further, in the present invention, the variable range of the first detection signal includes the first reference value, and the variable range of the second detection signal includes the second reference value. This contributes to further reduction in the variations in the position detection signal caused by a noise magnetic field. By virtue of these features, the position detection device of the present invention is capable of performing position detection with high accuracy even when subjected to a noise magnetic field.

Other and further objects, features and advantages of the present invention will appear more fully from the following description.

DETAILED DESCRIPTION OF THE PREFERRED EMBODIMENTS

First Embodiment

Figure 1:
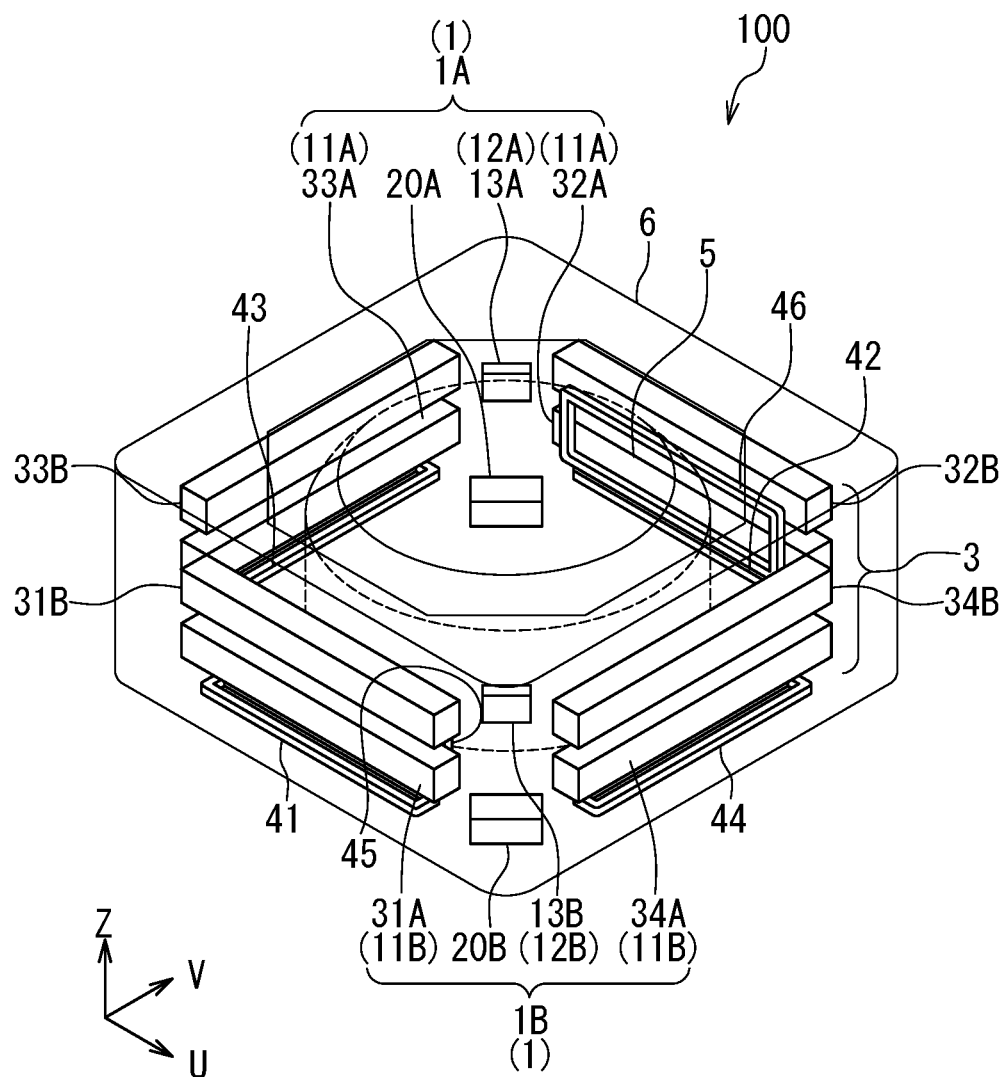
FIG. 1 is a perspective view of a camera module including a position detection device according to a first embodiment of the invention.
Figure 2:
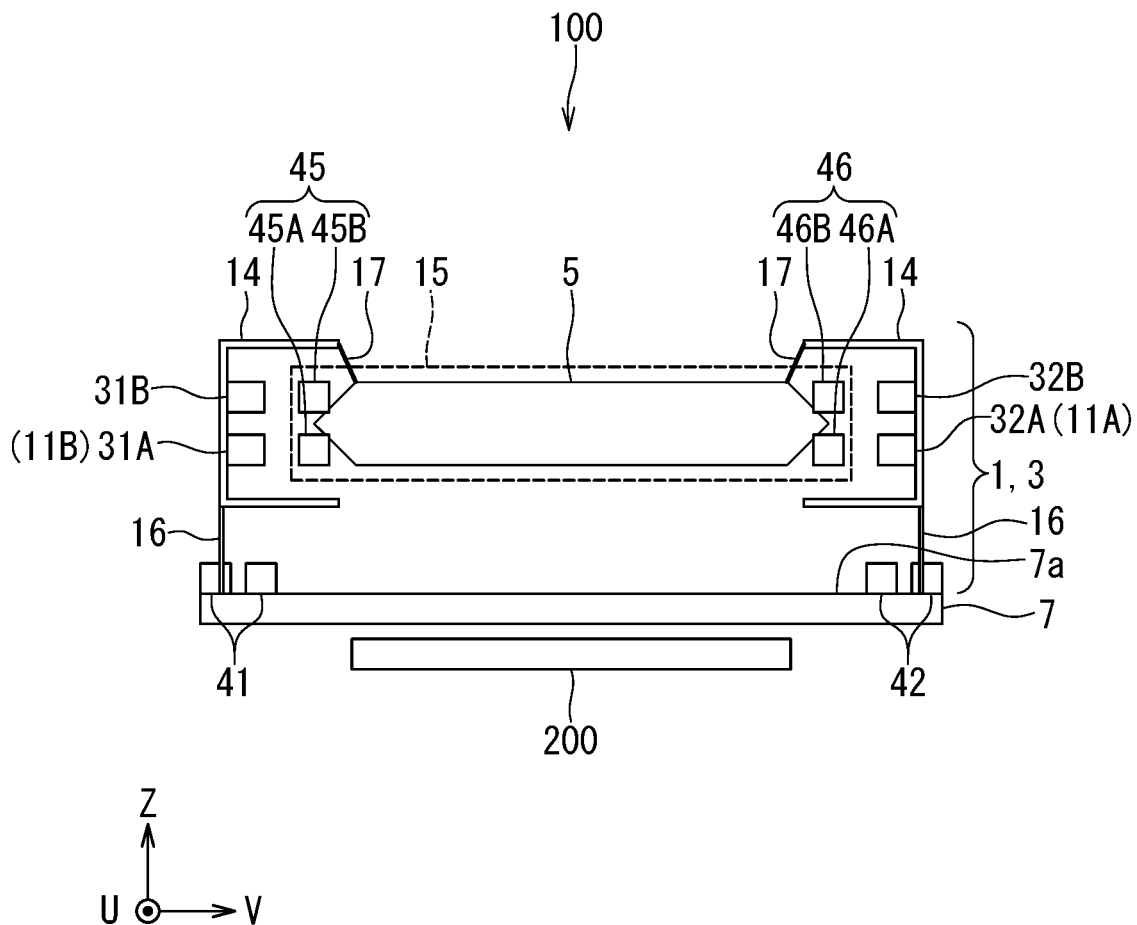
FIG. 2 illustrates an internal schematic view of the camera module of FIG. 1.

Preferred embodiments of the present invention will now be described in detail with reference to the drawings. First, reference is made to FIG. 1 and FIG. 2 to describe the configuration of a camera module including a position detection device according to a first embodiment of the invention. FIG. 1 is a perspective view of the camera module 100. FIG. 2 is a schematic internal view of the camera module 100. For ease of understanding, in FIG. 2 the parts of the cameral module 100 are drawn on a different scale and in a different layout than those in FIG. 1. The camera module 100 constitutes, for example, a portion of a camera for a smartphone having an optical image stabilization mechanism and an autofocus mechanism, and is used in combination with an image sensor 200 that uses CMOS or other similar techniques.

The camera module 100 includes a position detection device 1 according to the present embodiment, and a driving device 3, a lens 5, a housing 6 and a substrate 7. The position detection device 1 according to the present embodiment is a magnetic position detection device, and is used to detect the position of the lens 5 during automatic focusing. The driving device 3 is to move the lens 5. The housing 6 is to protect the position detection device 1 and the driving device 3. The substrate 7 has a top surface 7a. FIG. 1 omits the illustration of the substrate 7, and FIG. 2 omits the illustration of the housing 6.

Now, we define U, V, and Z directions as shown in FIGS. 1 and 2. The U, V, and Z directions are orthogonal to one another. In the present embodiment, the Z direction is a direction perpendicular to the top surface 7a of the substrate 7. In FIG. 2 the Z direction is the upward direction. The U and V directions are both parallel to the top surface 7a of the substrate 7. The opposite directions to the U, V, and Z directions will be referred to as −U, −V, and −Z directions, respectively. As used herein, the term "above" refers to positions located forward of a reference position in the Z direction, and "below" refers to positions located on a side of the reference position opposite from "above".

The lens 5 is disposed above the top surface 7a of the substrate 7 in such an orientation that the direction of its optical axis is parallel to the Z direction. The substrate 7 has an opening (not illustrated) for passing light that has passed through the lens 5. As shown in FIG. 2, the camera module 100 is in alignment with the image sensor 200 so that light that has passed through the lens 5 and the non-illustrated opening will enter the image sensor 200.

Figure 3:
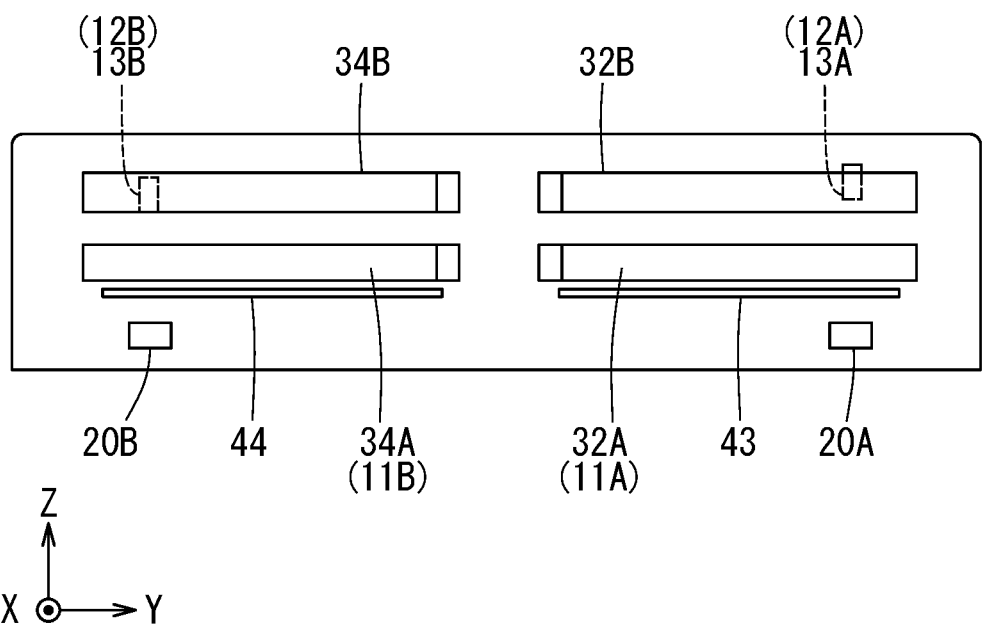
FIG. 3 is a side view of the principal parts of the camera module shown in FIG. 1.
Figure 4:
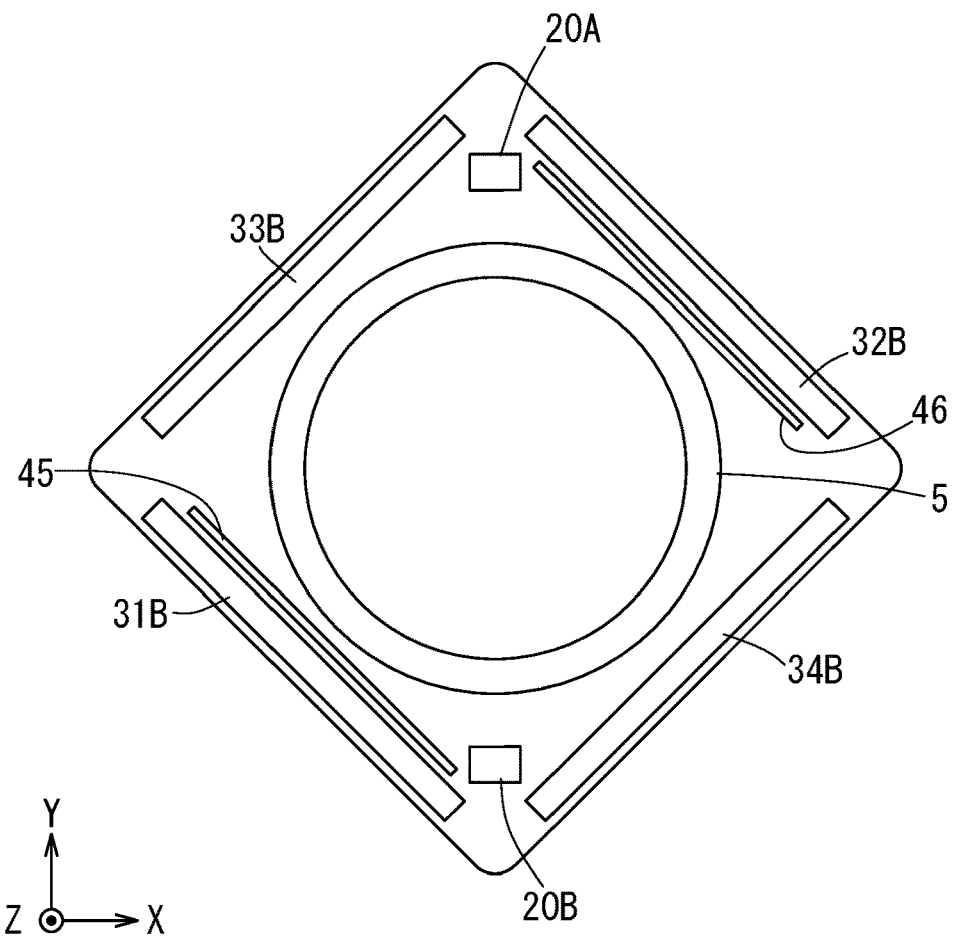
FIG. 4 is a plan view of the principal parts of the camera module shown in FIG. 1.
Figure 5:
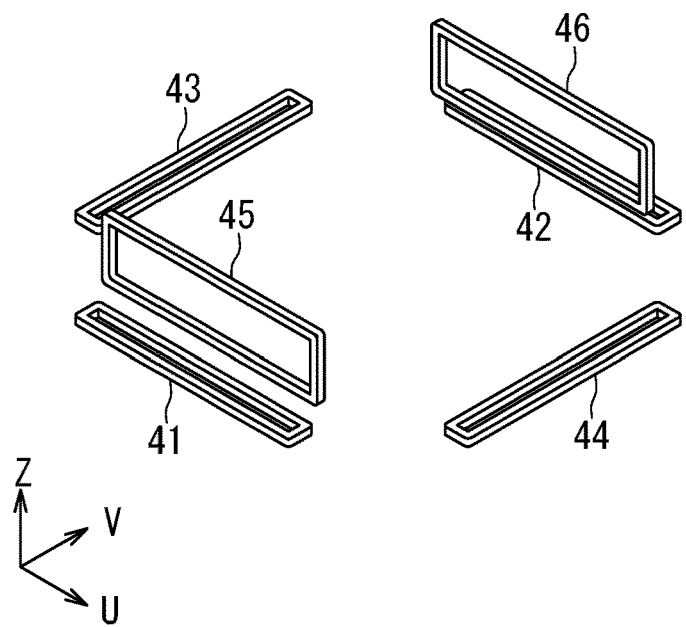
FIG. 5 is a perspective view of a plurality of coils of a driving device of FIG. 1.
Figure 6:
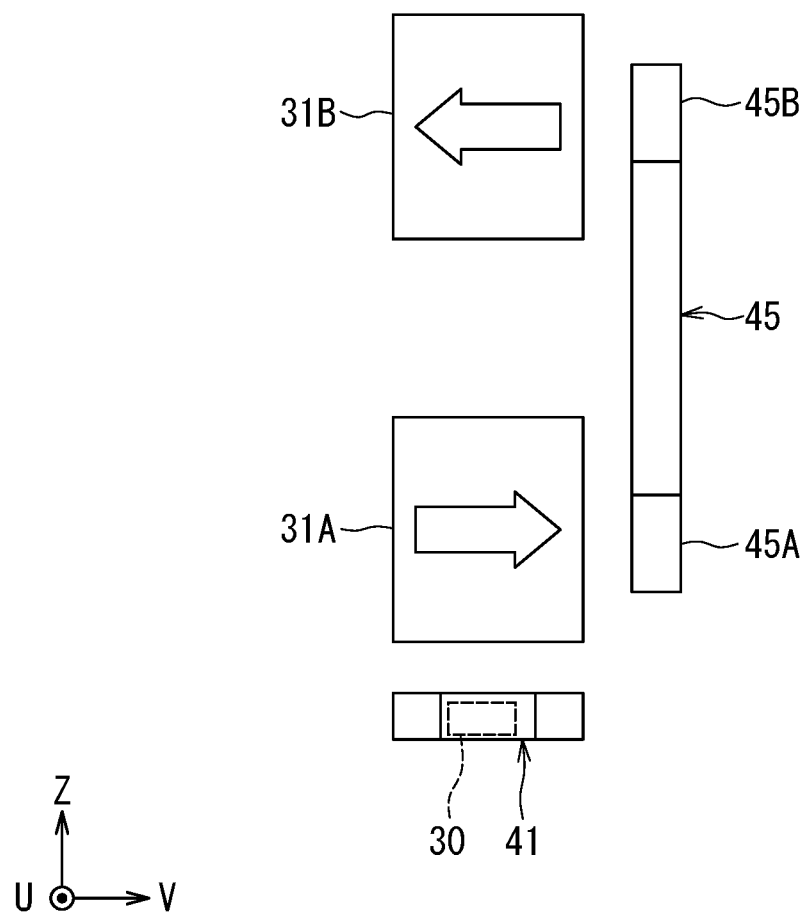
FIG. 6 is a side view illustrating the principal parts of the driving device of FIG. 1.

The position detection device 1 and the driving device 3 according to the present embodiment will now be described in detail with reference to FIG. 1 to FIG. 6. FIG. 3 is a side view of the principal parts of the camera module 100 shown in FIG. 1. FIG. 4 is a plan view of the principal parts of the camera module 100 shown in FIG. 1. FIG. 5 is a perspective view of a plurality of coils of the driving device 3. FIG. 6 is a side view illustrating the principal parts of the driving device 3.

Here, X and Y directions are defined as shown in FIGS. 3 and 4. Both the X and Y directions are parallel to the top surface 7a (see FIG. 2) of the substrate 7. The X direction is the direction rotated by 45° from the U direction toward the V direction. The Y direction is the direction rotated by 45° from the V direction toward the −U direction. The opposite directions to the X and Y directions will be referred to as −X and −Y directions, respectively. FIG. 3 is a side view of the principal parts of the camera module 100 as seen from a position forward of the camera module 100 in the X direction.

The position detection device 1 includes a first holding member 14, a second holding member 15, a plurality of first wires 16, and a plurality of second wires 17. The second holding member 15 is to hold the lens 5. Although not illustrated, the second holding member 15 is shaped like a hollow cylinder so that the lens 5 is insertable in the hollow.

The second holding member 15 is provided such that its position is variable in one direction, specifically, in the direction of the optical axis of the lens 5, i.e., a direction parallel to the Z direction, relative to the first holding member 14. In the present embodiment, the first holding member 14 is shaped like a box so that the lens 5 and the second holding member 15 can be accommodated therein. The plurality of second wires 17 connect the first and second holding members 14 and 15 and support the second holding member 15 such that the second holding member 15 is movable in a direction parallel to the Z direction relative to the first holding member 14.

The first holding member 14 is provided above the top surface 7a of the substrate 7 such that its position is variable relative to the substrate 7 in a direction parallel to the U direction and in a direction parallel to the V direction. The plurality of first wires 16 connect the substrate 7 and the first holding member 14, and support the first holding member 14 such that the first holding member 14 is movable relative to the substrate 7 in a direction parallel to the U direction and in a direction parallel to the V direction. When the position of the first holding member 14 relative to the substrate 7 varies, the position of the second holding member 15 relative to the substrate 7 also varies.

The driving device 3 includes magnets 31A, 31B, 32A, 32B, 33A, 33B, 34A and 34B, and coils 41, 42, 43, 44, 45 and 46. The magnet 31A is located forward of the lens 5 in the −V direction. The magnet 32A is located forward of the lens 5 in the V direction. The magnet 33A is located forward of the lens 5 in the −U direction. The magnet 34A is located forward of the lens 5 in the U direction. The magnets 31B, 32B, 33B and 34B are located above the magnets 31A, 32A, 33A and 34A, respectively. The magnets 31A, 31B, 32A, 32B, 33A, 33B, 34A and 34B are fixed to the first holding member 14.

As shown in FIG. 1, the magnets 31A, 31B, 32A and 32B are each in the shape of a rectangular solid that is long in the U direction. The magnets 33A, 33B, 34A and 34B are each in the shape of a rectangular solid that is long in the V direction. The magnets 31A and 32B are magnetized in the V direction. The magnets 31B and 32A are magnetized in the −V direction. The magnets 33A and 34B are magnetized in the U direction. The magnets 33B and 34A are magnetized in the −U direction. In FIG. 6, the arrows drawn inside the magnets 31A and 31B indicate the magnetization directions of the magnets 31A and 31B.

The coil 41 is located between the magnet 31A and the substrate 7. The coil 42 is located between the magnet 32A and the substrate 7. The coil 43 is located between the magnet 33A and the substrate 7. The coil 44 is located between the magnet 34A and the substrate 7. The coil 45 is located between the lens 5 and the magnets 31A and 31B. The coil 46 is located between the lens 5 and the magnets 32A and 32B. The coils 41, 42, 43 and 44 are fixed to the substrate 7. The coils 45 and 46 are fixed to the second holding member 15.

The coil 41 is subjected mainly to a magnetic field generated by the magnet 31A. The coil 42 is subjected mainly to a magnetic field generated by the magnet 32A. The coil 43 is subjected mainly to a magnetic field generated by the magnet 33A. The coil 44 is subjected mainly to a magnetic field generated by the magnet 34A.

As shown in FIGS. 2, 5 and 6, the coil 45 includes a first conductor portion 45A extending along the magnet 31A in the U direction, a second conductor portion 45B extending along the magnet 31B in the U direction, and two third conductor portions connecting the first and second conductor portions 45A and 45B. As shown in FIGS. 2 and 5, the coil 46 includes a first conductor portion 46A extending along the magnet 32A in the U direction, a second conductor portion 46B extending along the magnet 32B in the U direction, and two third conductor portions connecting the first and second conductor portions 46A and 46B.

The first conductor portion 45A of the coil 45 is subjected mainly to a component in the V direction of the magnetic field generated by the magnet 31A. The second conductor portion 45B of the coil 45 is subjected mainly to a component in the −V direction of a magnetic field generated by the magnet 31B. The first conductor portion 46A of the coil 46 is subjected mainly to a component in the −V direction of the magnetic field generated by the magnet 32A. The second conductor portion 46B of the coil 46 is subjected mainly to a component in the V direction of a magnetic field generated by the magnet 32B.

The position detection device 1 further includes a first position detector 1A and a second position detector 1B. The first position detector 1A includes a first magnetic field generation unit 11A for generating a first magnetic field, a second magnetic field generation unit 12A for generating a second magnetic field, and a first magnetic sensor 20A. The second position detector 1B includes a third magnetic field generation unit 11B for generating a third magnetic field, a fourth magnetic field generation unit 12B for generating a fourth magnetic field, and a second magnetic sensor 20B.

The first magnetic field generation unit 11A has two magnets disposed at different positions. In the present embodiment, specifically, the first magnetic field generation unit 11A has the magnets 32A and 33A as the aforementioned two magnets. The first magnetic field is a composite of the magnetic fields that are respectively generated by the magnets 32A and 33A. As mentioned above, the magnets 32A and 33A are fixed to the first holding member 14. The first magnetic field generation unit 11A is thus held by the first holding member 14.

The third magnetic field generation unit 11B has two magnets disposed at different positions. In the present embodiment, specifically, the third magnetic field generation unit 11B has the magnets 31A and 34A as the aforementioned two magnets. The third magnetic field is a composite of the magnetic fields that are respectively generated by the magnets 31A and 34A. As mentioned above, the magnets 31A and 34A are fixed to the first holding member 14. The third magnetic field generation unit 11B is thus held by the first holding member 14.

The magnet 32A has an end face located at the end of the magnet 32A in the −U direction. The magnet 33A has an end face located at the end of the magnet 33A in the V direction.

The second magnetic field generation unit 12A is provided such that its position relative to the first magnetic field generation unit 11A is variable. In the present embodiment, the second magnetic field generation unit 12A has a magnet 13A. The second magnetic field is a magnetic field generated by the magnet 13A. The magnet 13A is in the shape of a rectangular solid. The magnet 13A is fixed to the second holding member 15 in a space near the end face of the magnet 32A and the end face of the magnet 33A. The second magnetic field generation unit 12A is thus held by the second holding member 15. When the position of the second holding member 15 relative to the first holding member 14 varies in a direction parallel to the Z direction, the position of the second magnetic field generation unit 12A relative to the first magnetic field generation unit 11A also varies in the direction parallel to the Z direction.

The magnet 31A has an end face located at the end of the magnet 31A in the U direction. The magnet 34A has an end face located at the end of the magnet 34A in the −V direction.

The fourth magnetic field generation unit 12B is provided such that its position relative to the third magnetic field generation unit 11B is variable. In the present embodiment, the fourth magnetic field generation unit 12B has a magnet 13B. The fourth magnetic field is a magnetic field generated by the magnet 13B. The magnet 13B is in the shape of a rectangular solid. The magnet 13B is fixed to the second holding member 15 in a space near the end face of the magnet 31A and the end face of the magnet 34A. The fourth magnetic field generation unit 12B is thus held by the second holding member 15. When the position of the second holding member 15 relative to the first holding member 14 varies in a direction parallel to the Z direction, the position of the fourth magnetic field generation unit 12B relative to the third magnetic field generation unit 11B also varies in the direction parallel to the Z direction.

Each of the first and second magnetic sensors 20A and 20B includes at least one magnetoresistive (MR) element.

The first magnetic sensor 20A is configured to detect a first detection-target magnetic field at a first detection position in a first reference plane, and to generate a first detection signal that varies in magnitude according to the direction of the first detection-target magnetic field. The first detection-target magnetic field is a magnetic field component parallel to the first reference plane. The first detection-target magnetic field will hereinafter be referred to as the first target magnetic field MFA. The first magnetic sensor 20A is fixed to the substrate 7 at a position near the end face of the magnet 32A and the end face of the magnet 33A. The distance from the magnet 32A to the first magnetic sensor 20A and the distance from the magnet 33A to the first magnetic sensor 20A are equal. The magnet 13A is disposed above the first magnetic sensor 20A.

The first detection position is a position at which the first magnetic sensor 20A detects the first magnetic field and the second magnetic field. In the present embodiment, the first reference plane is a plane that contains the first detection position and is perpendicular to the Z direction. When the position of the second magnetic field generation unit 12A relative to the first magnetic field generation unit 11A varies, the distance between the first detection position and the second magnetic field generation unit 12A varies.

A component of the first magnetic field at the first detection position, the component being parallel to the first reference plane, will be referred to the first magnetic field component MF1. A component of the second magnetic field at the first detection position, the component being parallel to the first reference plane, will be referred to as the second magnetic field component MF2. When there is not any noise magnetic field to be described later, the first target magnetic field MFA is a composite magnetic field of the first magnetic field component MF1 and the second magnetic field component MF2.

The second magnetic sensor 20B is configured to detect a second detection-target magnetic field at a second detection position in a second reference plane, and to generate a second detection signal that varies in magnitude according to the direction of the second detection-target magnetic field. The second detection-target magnetic field is a magnetic field component parallel to the second reference plane. The second detection-target magnetic field will hereinafter be referred to as the second target magnetic field MFB. The second magnetic sensor 20B is fixed to the substrate 7 at a position near the end face of the magnet 31A and the end face of the magnet 34A. The distance from the magnet 31A to the second magnetic sensor 20B and the distance from the magnet 34A to the second magnetic sensor 20B are equal. The magnet 13B is disposed above the second magnetic sensor 20B.

The second detection position is a position at which the second magnetic sensor 20B detects the third magnetic field and the fourth magnetic field. In the present embodiment, the second reference plane is a plane that contains the second detection position and is perpendicular to the Z direction. When the position of the fourth magnetic field generation unit 12B relative to the third magnetic field generation unit 11B varies, the distance between the second detection position and the fourth magnetic field generation unit 12B varies.

A component of the third magnetic field at the second detection position, the component being parallel to the second reference plane, will be referred to the third magnetic field component MF3. A component of the fourth magnetic field at the second detection position, the component being parallel to the second reference plane, will be referred to as the fourth magnetic field component MF4. When there is not any noise magnetic field to be described later, the second target magnetic field MFB is a composite magnetic field of the third magnetic field component MF3 and the fourth magnetic field component MF4.

The direction of the third magnetic field component MF3 is opposite to the direction of the first magnetic field component MF1. The direction of the fourth magnetic field component MF4 is opposite to the direction of the second magnetic field component MF2. The first magnetic field component MF1 and the third magnetic field component MF3 preferably have strengths of equal absolute values.

The driving device 3 further includes a magnetic sensor 30 disposed on the inner side of one of the coils 41 and 42 and fixed to the substrate 7, and a magnetic sensor 30 disposed on the inner side of one of the coils 43 and 44 and fixed to the substrate 7. Assume here that the two magnetic sensors 30 are disposed on the inner sides of the coils 41 and 44, respectively. As will be described later, the two magnetic sensors 30 are used to adjust the position of the lens 5 to reduce the effect of hand-induced camera shake.

The magnetic sensor 30 disposed on the inner side of the coil 41 detects the magnetic field generated by the magnet 31A and generates a signal corresponding to the position of the magnet 31A. The magnetic sensor 30 disposed on the inner side of the coil 44 detects the magnetic field generated by the magnet 34A and generates a signal corresponding to the position of the magnet 34A. For example, the magnetic sensors 30 are constructed of elements for detecting magnetic fields, such as Hall elements.

Figure 7:
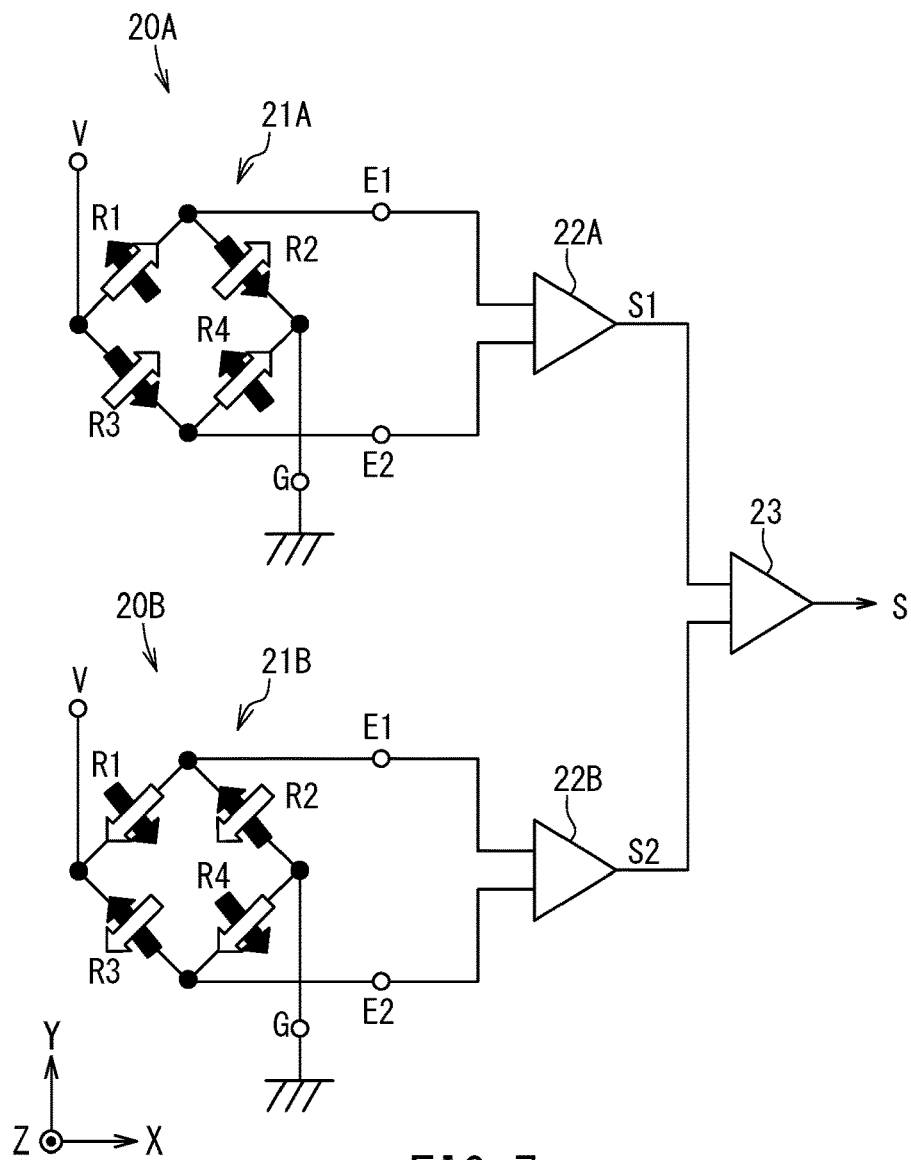
FIG. 7 is a circuit diagram illustrating the circuit configuration of the position detection device according to the first embodiment of the invention.

An example of the circuit configuration of the position detection device 1 will now be described with reference to FIG. 7. FIG. 7 is a circuit diagram illustrating the circuit configuration of the position detection device 1. In the present embodiment, the first magnetic sensor 20A is configured to generate, as the first detection signal corresponding to the direction of the first target magnetic field MFA, a signal corresponding to an angle that the direction of the first target magnetic field MFA forms with a first reference direction. The first reference direction will be described in detail later.

The second magnetic sensor 20B is configured to generate, as the second detection signal corresponding to the direction of the second target magnetic field MFB, a signal corresponding to an angle that the direction of the second target magnetic field MFB forms with a second reference direction. The second reference direction will be described in detail later.

As shown in FIG. 7, the first magnetic sensor 20A includes a Wheatstone bridge circuit 21A and a difference detector 22A. The second magnetic sensor 20B includes a Wheatstone bridge circuit 21B and a difference detector 22B.

Each of the Wheatstone bridge circuits 21A and 21B includes a power supply port V configured to receive a predetermined voltage, a ground port G connected to the ground, a first output port E1, and a second output port E2.

Each of the Wheatstone bridge circuits 21A and 21B further includes a first resistor section R1, a second resistor section R2, a third resistor section R3, and a fourth resistor section R4. The first resistor section R1 is provided between the power supply port V and the first output port E1. The second resistor section R2 is provided between the first output port E1 and the ground port G. The third resistor section R3 is provided between the power supply port V and the second output port E2. The fourth resistor section R4 is provided between the second output port E2 and the ground port G.

The first resistor section R1 includes at least one first MR element. The second resistor section R2 includes at least one second MR element. The third resistor section R3 includes at least one third MR element. The fourth resistor section R4 includes at least one fourth MR element.

In the present embodiment, specifically, the first resistor section R1 includes a plurality of first MR elements connected in series, the second resistor section R2 includes a plurality of second MR elements connected in series, the third resistor section R3 includes a plurality of third MR elements connected in series, and the fourth resistor section R4 includes a plurality of fourth MR elements connected in series.

The MR elements included in each of the Wheatstone bridge circuits 21A and 21B are spin-valve MR elements. The spin-valve MR elements each include a magnetization pinned layer having a magnetization whose direction is fixed, a free layer having a magnetization whose direction is variable according to the direction of the target magnetic field, and a gap layer disposed between the magnetization pinned layer and the free layer. The spin-valve MR elements may be tunneling magnetoresistive (TMR) elements or giant magnetoresistive (GMR) elements. In the TMR elements, the gap layer is a tunnel barrier layer. In the GMR elements, the gap layer is a nonmagnetic conductive layer. Each spin-valve MR element varies in resistance according to the angle that the magnetization direction of the free layer forms with the magnetization direction of the magnetization pinned layer, and has a minimum resistance when the foregoing angle is 0° and a maximum resistance when the foregoing angle is 180°. In FIG. 7, the filled arrows indicate the magnetization directions of the magnetization pinned layers of the MR elements, and the hollow arrows indicate the magnetization directions of the free layers of the MR elements.

In the Wheatstone bridge circuit 21A, the magnetization pinned layers of the MR elements in the resistor sections R1 and R4 have magnetizations in a first direction. The magnetization pinned layers of the MR elements in the resistor sections R2 and R3 have magnetizations in a second direction opposite to the first direction. The first direction will be denoted by the symbol MP1, and the second direction will be denoted by the symbol MP2.

In the Wheatstone bridge circuit 21A, the electric potential at the output port E1, the electric potential at the output port E2, and the potential difference between the output ports E1 and E2 vary according to the cosine of the angle that the direction of the first target magnetic field MFA forms with the first direction MP1. The difference detector 22A outputs a signal corresponding to the potential difference between the output ports E1 and E2 as the first detection signal S1. The first detection signal S1 depends on the electric potential at the output port E1, the electric potential at the output port E2, and the potential difference between the output ports E1 and E2. The first detection signal S1 varies according to the direction of the first target magnetic field MFA, and therefore corresponds to the direction of the first target magnetic field MFA.

In the Wheatstone bridge circuit 21B, the magnetization pinned layers of the MR elements in the resistor sections R1 and R4 have magnetizations in a third direction. The magnetization pinned layers of the MR elements in the resistor sections R2 and R3 have magnetizations in a fourth direction opposite to the third direction. The third direction will be denoted by the symbol MP3, and the fourth direction will be denoted by the symbol MP4. The third direction MP3 is the same as the second direction MP2. The fourth direction MP4 is the same as the first direction MP1.

In the Wheatstone bridge circuit 21B, the electric potential at the output port E1, the electric potential at the output port E2, and the potential difference between the output ports E1 and E2 vary according to the cosine of the angle that the direction of the second target magnetic field MFB forms with the third direction MP3. The difference detector 22B outputs a signal corresponding to the potential difference between the output ports E1 and E2 as the second detection signal S2. The second detection signal S2 depends on the electric potential at the output port E1, the electric potential at the output port E2, and the potential difference between the output ports E1 and E2. The second detection signal S2 varies according to the direction of the second target magnetic field MFB, and therefore corresponds to the direction of the second target magnetic field MFB.

As shown in FIG. 7, the position detection device 1 includes a signal generator 23 for generating a position detection signal S corresponding to a detection-target position. The signal generator 23 generates the sum of the first detection signal S1 and the second detection signal S2 as the position detection signal S. The signal generator 23 is constructed of an adder, for example. The position detection device 1 may output, as a signal indicative of the detection-target position, the position detection signal S itself, or a signal that is not the position detection signal S itself but corresponds to the position detection signal S, such as a normalized position detection signal or a corrected position detection signal, which will be described later.

At least one of the first position detector 1A and the second position detector 1B may include a bias magnetic field generation unit for generating a bias magnetic field to be applied to the first magnetic sensor 20A or the second magnetic sensor 20B. In the following, a description will be given of an example where both of the first magnetic sensor 20A and the second magnetic sensor 20B are provided with their respective bias magnetic field generation units.

In the following description, the bias magnetic field generation unit of the first position detector 1A will be referred to as the first bias magnetic field generation unit HMA, and the bias magnetic field generation unit of the second position detector 1B will be referred to as the second bias magnetic field generation unit HMB. The bias magnetic field generated by the first bias magnetic field generation unit HMA will be referred to as the first bias magnetic field BA, and the bias magnetic field generated by the second bias magnetic field generation unit HMB will be referred to as the second bias magnetic field BB.

Figure 8:
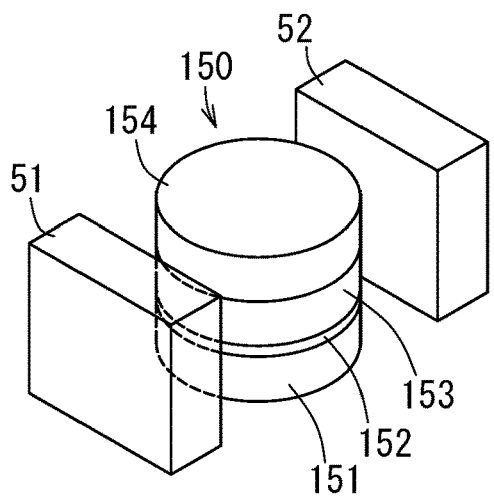
FIG. 8 is a perspective view of a portion of a resistor section of FIG. 7.

An example of the configuration of the resistor sections R1, R2, R3 and R4 will now be described with reference to FIG. 8. FIG. 8 is a perspective view illustrating a portion of one of the resistor sections R1, R2, R3 and R4. In this example, the resistor section includes a plurality of MR elements 150 connected in series. FIG. 8 shows a single MR element 150.

The MR element 150 includes a free layer 151, a gap layer 152, a magnetization pinned layer 153, and an antiferromagnetic layer 154 which are stacked in this order in the Z direction. The antiferromagnetic layer 154 is formed of an antiferromagnetic material, and is in exchange coupling with the magnetization pinned layer 153 so as to fix the magnetization direction of the magnetization pinned layer 153.

It should be appreciated that the layers 151 to 154 of each MR element 150 may be stacked in the reverse order to that shown in FIG. 8. Each MR element 150 may also be configured without the antiferromagnetic layer 154. In such a configuration, for example, a magnetization pinned layer of an artificial antiferromagnetic structure, which includes two ferromagnetic layers and a nonmagnetic metal layer interposed between the two ferromagnetic layers, may be provided in place of the antiferromagnetic layer 154 and the magnetization pinned layer 153.

In the present embodiment, each of the first and second bias magnetic field generation units HMA and HMB includes a plurality of pairs of magnets 51 and 52 corresponding to the plurality of MR elements 150. The magnets 51 and 52 making up each pair of magnets 51 and 52 are disposed opposite to each other in a direction orthogonal to the Z direction, with one MR element 150 located between the magnets 51 and 52. Each pair of magnets 51 and 52 applies a bias magnetic field to a corresponding one of the MR elements located between the magnets 51 and 52. That is, the plurality of pairs of magnets 51 and 52 apply bias magnetic fields to the MR elements 150 on an element-by-element basis. The bias magnetic fields applied to the MR elements 150 on an element-by-element basis will be referred to as the element-by-element bias magnetic fields.

The element-by-element bias magnetic fields applied to the MR elements 150 in the first magnetic sensor 20A are in the same direction as the first bias magnetic field BA. The first bias magnetic field BA contains the element-by-element bias magnetic fields applied to the MR elements 150 in the first magnetic sensor 20A.

Likewise, the element-by-element bias magnetic fields applied to the MR elements 150 in the second magnetic sensor 20B are in the same direction as the second bias magnetic field BB. The second bias magnetic field BB contains the element-by-element bias magnetic fields applied to the MR elements 150 in the second magnetic sensor 20B.

Reference is now made to FIG. 1 to FIG. 6 to describe the operation of the driving device 3. The driving device 3 constitutes part of optical image stabilization and autofocus mechanisms. Such mechanisms will be briefly described first. A control unit (not illustrated) external to the camera module 100 controls the driving device 3, the optical image stabilization mechanism and the autofocus mechanism.

The optical image stabilization mechanism is configured to detect hand-induced camera shake using, for example, a gyrosensor external to the camera module 100. Upon detection of hand-induced camera shake by the optical image stabilization mechanism, the non-illustrated control unit controls the driving device 3 so as to vary the position of the lens 5 relative to the substrate 7 depending on the mode of the camera shake. This stabilizes the absolute position of the lens 5 to reduce the effect of the camera shake. The position of the lens 5 relative to the substrate 7 is varied in a direction parallel to the U direction or parallel to the V direction, depending on the mode of the camera shake.

The autofocus mechanism is configured to detect a state in which focus is achieved on the subject, using, for example, an image sensor 200 or an autofocus sensor. Using the driving device 3, the non-illustrated control unit varies the position of the lens 5 relative to the substrate 7 in a direction parallel to the Z direction so as to achieve focus on the subject. This enables automatic focusing on the subject.

Next, a description will be given of the operation of the driving device 3 related to the optical image stabilization mechanism. When currents are passed through the coils 41 and 42 by the non-illustrated control unit, the first holding member 14 with the magnets 31A and 32A fixed thereto moves in a direction parallel to the V direction due to interaction between the magnetic fields generated by the magnets 31A and 32A and the magnetic fields generated by the coils 41 and 42. As a result, the lens 5 also moves in the direction parallel to the V direction. On the other hand, when currents are passed through the coils 43 and 44 by the non-illustrated control unit, the first holding member 14 with the magnets 33A and 34A fixed thereto moves in a direction parallel to the U direction due to interaction between the magnetic fields generated by the magnets 33A and 34A and the magnetic fields generated by the coils 43 and 44. As a result, the lens 5 also moves in the direction parallel to the U direction. The non-illustrated control unit detects the position of the lens 5 by measuring signals corresponding to the positions of the magnets 31A and 34A, which are generated by the two magnetic sensors 30.

Next, the operation of the driving device 3 related to the autofocus mechanism will be described. To move the position of the lens 5 relative to the substrate 7 in the Z direction, the non-illustrated control unit passes a current through the coil 45 such that the current flows through the first conductor portion 45A in the U direction and flows through the second conductor portion 45B in the −U direction, and passes a current through the coil 46 such that the current flows through the first conductor portion 46A in the −U direction and flows through the second conductor portion 46B in the U direction. These currents and the magnetic fields generated by the magnets 31A, 31B, 32A and 32B cause a Lorentz force in the Z direction to be exerted on the first and second conductor portions 45A and 45B of the coil 45 and the first and second conductor portions 46A and 46B of the coil 46. This causes the second holding member 15 with the coils 45 and 46 fixed thereto to move in the Z direction. As a result, the lens 5 also moves in the Z direction.

To move the position of the lens 5 relative to the substrate 7 in the −Z direction, the non-illustrated control unit passes currents through the coils 45 and 46 in directions opposite to those in the case of moving the position of the lens 5 relative to the substrate 7 in the Z direction.

The function and effects of the position detection device 1 according to the present embodiment will now be described. The position detection device 1 according to the present embodiment is used to detect the position of the lens 5 relative to the substrate 7. The position of the lens 5 relative to the substrate 7 is the detection-target position for the position detection device 1 according to the embodiment. Hereinafter, the detection-target position will simply be referred to as the target position. The target position varies within a predetermined movable range. In the present embodiment, the target position varies in a direction of the optical axis of the lens 5, that is, in a direction parallel to the Z direction.

In the present embodiment, when the target position varies, the position of the second holding member 15 also varies relative to each of the substrate 7 and the first holding member 14. As previously mentioned, the first holding member 14 holds the first and third magnetic field generation units 11A and 11B, and the second holding member 15 holds the second and fourth magnetic field generation units 12A and 12B. Accordingly, when the target position varies, the position of the second magnetic field generation unit 12A relative to the first magnetic field generation unit 11A varies, and also the position of the fourth magnetic field generation unit 12B relative to the third magnetic field generation unit 11B varies.

When the target position varies, the position of each of the second and fourth magnetic field generation units 12A and 12B relative to the substrate 7 varies, whereas the position of each of the first and third magnetic field generation units 11A and 11B relative to the substrate 7 does not vary.

Therefore, when the target position varies, the strength of the second magnetic field component MF2 varies whereas none of the strength and direction of the first magnetic field component MF1 and the direction of the second magnetic field component MF2 vary. When the strength of the second magnetic field component MF2 varies, the direction and strength of the first target magnetic field MFA vary, and accordingly, the value of the first detection signal S1 to be generated by the first magnetic sensor 20A varies.

Likewise, when the target position varies, the strength of the fourth magnetic field component MF4 varies whereas none of the strength and direction of the third magnetic field component MF3 and the direction of the fourth magnetic field component MF4 vary. When the strength of the fourth magnetic field component MF4 varies, the direction and strength of the second target magnetic field MFB vary, and accordingly, the value of the second detection signal S2 to be generated by the second magnetic sensor 20B varies.

The position detection signal S, which is the sum of the first detection signal S1 and the second detection signal S2, varies depending on the target position. The non-illustrated control unit detects the target position by measuring the position detection signal S.

Figure 9:
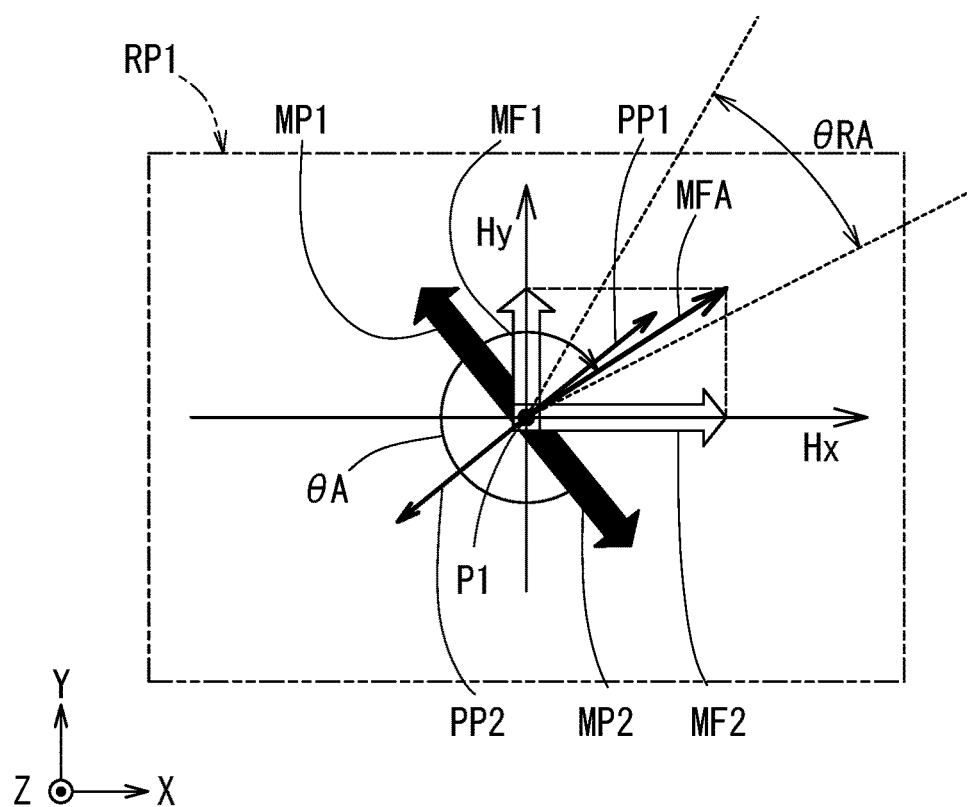
FIG. 9 is an explanatory diagram illustrating the magnetization direction of a magnetization pinned layer in a first magnetic sensor of the position detection device and the directions of first and second magnetic field components in the first embodiment of the invention.

Reference is now made to FIG. 9 to describe in detail the first and second directions MP1 and MP2 and the first and second magnetic field components MF1 and MF2 for the first magnetic sensor 20A. In FIG. 9, the symbol RP1 represents the first reference plane, and the symbol P1 represents the first detection position. In FIG. 9, the arrow labeled MF1 represents the first magnetic field component MF1, the arrow labeled MF2 represents the second magnetic field component MF2, and the arrow labeled MFA represents the first target magnetic field MFA. Further, in FIG. 9 the axis in the X direction represents the strength Hx of a magnetic field in the X direction, and the axis in the Y direction represents the strength Hy of a magnetic field in the Y direction.

In the present embodiment, the first magnetic field component MF1 is in the Y direction. The second magnetic field component MF2 is in a direction different from the direction of the first magnetic field component MF1. In the present embodiment, the second magnetic field component MF2 is specifically in the X direction, which is orthogonal to the direction of the first magnetic field component MF1.

When there is no noise magnetic field, the first target magnetic field MFA is a composite magnetic field of the first and second magnetic field components MF1 and MF2, and therefore the direction of the first target magnetic field MFA is different from both of the direction of the first magnetic field component MF1 and the direction of the second magnetic field component MF2, and is between those directions. The variable range of the direction of the first target magnetic field MFA is below 180°. In the present embodiment, since the direction of the second magnetic field component MF2 is orthogonal to the direction of the first magnetic field component MF1, the variable range of the direction of the first target magnetic field MFA is below 90°.

In FIG. 9, the symbols PP1 and PP2 represent two directions orthogonal to the first direction MP1 in the first reference plane RP1. Two directions orthogonal to the second direction MP2 in the first reference plane RP1 are also the directions PP1 and PP2. In the present embodiment, each of the two directions PP1 and PP2 is different from both of the direction of the first magnetic field component MF1 and the direction of the second magnetic field component MF2.

In the present embodiment, the first reference direction is the second direction MP2. Hereinafter, the angle that the direction of the first target magnetic field MFA forms with the first reference direction when seen in a clockwise direction from the first reference direction in FIG. 9 will be referred to as the first target angle and denoted by symbol θA. The first target angle θA indicates the direction of the first target magnetic field MFA. In the present embodiment, the first magnetic sensor 20A generates the first detection signal S1 corresponding to the first target angle θA. The variable range of the first target angle θA corresponding to the variable range of the direction of the first target magnetic field MFA will be denoted by symbol θRA.

Figure 10:
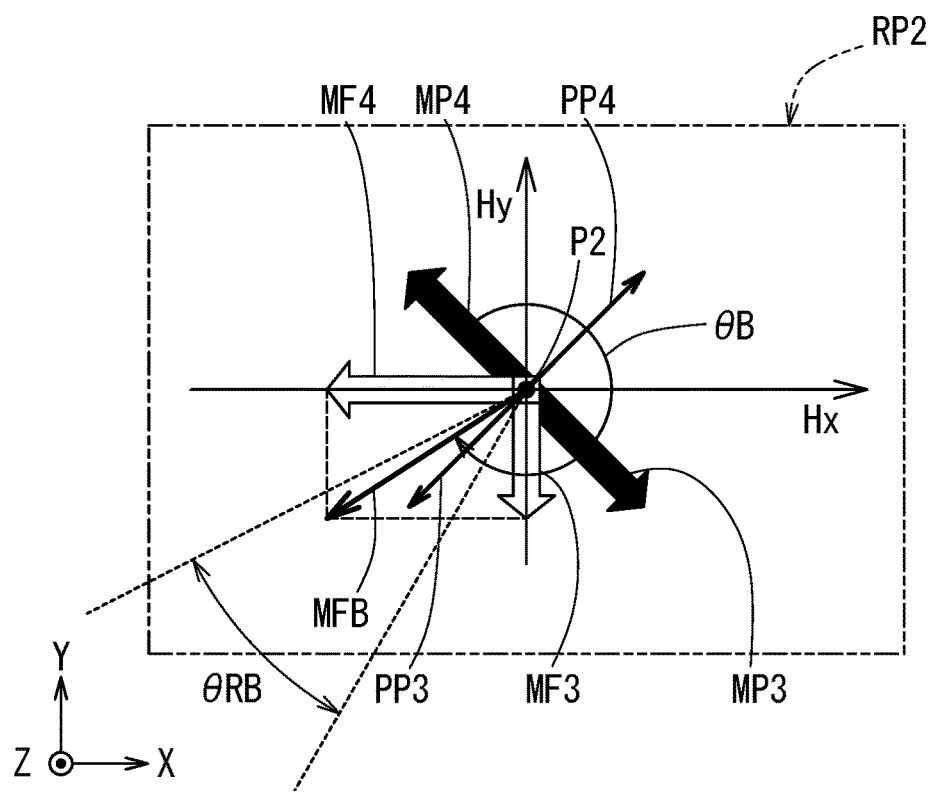
FIG. 10 is an explanatory diagram illustrating the magnetization direction of a magnetization pinned layer in a second magnetic sensor of the position detection device and the directions of third and fourth magnetic field components in the first embodiment of the invention.

Reference is now made to FIG. 10 to describe in detail the third and fourth directions MP3 and MP4 and the third and fourth magnetic field components MF3 and MF4 for the second magnetic sensor 20B. In FIG. 10, the symbol RP2 represents the second reference plane, and the symbol P2 represents the second detection position. In FIG. 10, the arrow labeled MF3 represents the third magnetic field component MF3, the arrow labeled MF4 represents the fourth magnetic field component MF4, and the arrow labeled MFB represents the second target magnetic field MFB. Further, in FIG. 10 the axis in the X direction represents the strength Hx of a magnetic field in the X direction, and the axis in the Y direction represents the strength Hy of a magnetic field in the Y direction.

In the present embodiment, the third magnetic field component MF3 is in the −Y direction, which is opposite to the direction of the first magnetic field component MF1. The fourth magnetic field component MF4 is in a direction different from the direction of the third magnetic field component MF3. In the present embodiment, the fourth magnetic field component MF4 is specifically in the −X direction, which is opposite to the direction of the second magnetic field component MF2 and orthogonal to the direction of the third magnetic field component MF3.

When there is no noise magnetic field, the second target magnetic field MFB is a composite magnetic field of the third and fourth magnetic field components MF3 and MF4, and therefore the direction of the second target magnetic field MFB is different from both of the direction of the third magnetic field component MF3 and the direction of the fourth magnetic field component MF4, and is between those directions. The variable range of the direction of the second target magnetic field MFB is below 180°. In the present embodiment, since the direction of the fourth magnetic field component MF4 is orthogonal to the direction of the third magnetic field component MF3, the variable range of the direction of the second target magnetic field MFB is below 90°.

In FIG. 10, the symbols PP3 and PP4 represent two directions orthogonal to the third direction MP3 in the second reference plane RP2. Two directions orthogonal to the fourth direction MP4 in the second reference plane RP2 are also the directions PP3 and PP4. In the present embodiment, each of the two directions PP3 and PP4 is different from both of the direction of the third magnetic field component MF3 and the direction of the fourth magnetic field component MF4.

In the present embodiment, the second reference direction is the fourth direction MP4. Hereinafter, the angle that the direction of the second target magnetic field MFB forms with the second reference direction when seen in a clockwise direction from the second reference direction in FIG. 10 will be referred to as the second target angle and denoted by symbol θB. The second target angle θB indicates the direction of the second target magnetic field MFB. In the present embodiment, the second magnetic sensor 20B generates the second detection signal S2 corresponding to the second target angle θB. The variable range of the second target angle θB corresponding to the variable range of the direction of the second target magnetic field MFB will be denoted by symbol θRB.

In the light of the accuracy of production of the MR elements, the accuracy of positioning of the magnetic sensors 20A and 20B, the accuracy of positioning of the first to fourth magnetic field generation units 11A, 12A, 11B and 12B or other factors, the first to fourth directions MP1 to MP4 and the respective directions of the first to fourth magnetic field components MF1 to MF4 may be slightly different from the above-described directions.

The target position will now be described. In the present embodiment, the distance between the substrate 7 and the lens 5 when the lens 5 is farthest from the substrate 7 is referred to as the maximum distance. The target position is represented as a value obtained by subtracting the distance between the lens 5 at any position and the substrate 7 from the maximum distance. In the present embodiment, the movable range of the target position is set in a range of 0 to 400 μm.

Now, definitions of a plurality of terms used herein will be presented. The following description assumes that there is no noise magnetic field unless otherwise specified.

As used herein, a first reference value refers to an average value of the maximum value and the minimum value of the first detection signal S1 when the direction of the first target magnetic field MFA varies over a range of 360°. Likewise, a second reference value refers to an average value of the maximum value and the minimum value of the second detection signal S2 when the direction of the second target magnetic field MFB varies over the range of 360°. In the present embodiment, the maximum value and the minimum value of the second detection signal S2 when the direction of the second target magnetic field MFB varies over the range of 360° are respectively equal to the maximum value and the minimum value of the first detection signal S1 when the direction of the first target magnetic field MFA varies over the range of 360°. Further, the second reference value is equal to the first reference value.

A first normalized detection signal NS1 refers to a signal that is obtained by normalizing the first detection signal S1 so that its maximum value and minimum value when the direction of the first target magnetic field MFA varies over the range of 360° respectively correspond to 1 and −1. The value zero of the first normalized detection signal NS1 corresponds to the first reference value mentioned above.

Likewise, a second normalized detection signal NS2 refers to a signal that is obtained by normalizing the second detection signal S2 so that its maximum value and minimum value when the direction of the second target magnetic field MFB varies over the range of 360° respectively correspond to 1 and −1. The value zero of the second normalized detection signal NS2 corresponds to the second reference value mentioned above.

A normalized position detection signal NS refers to the sum of the first normalized detection signal NS1 and the second normalized detection signal NS2. The normalized position detection signal NS corresponds to a signal that is obtained by normalizing the position detection signal S in the same manner as the normalizations of the first and second detection signals S1 and S2 described above.

The first normalized detection signal NS1, the second normalized detection signal NS2 and the normalized position detection signal NS are collectively referred to as normalized detection signals.

A first corrected detection signal CS1 refers to a signal that is obtained by correcting the first normalized detection signal NS1 by adding an offset thereto as necessary so that the value of the first normalized detection signal NS1 when the target position is in the middle of its movable range corresponds to zero.

Likewise, a second corrected detection signal CS2 refers to a signal that is obtained by correcting the second normalized detection signal NS2 by adding an offset thereto as necessary so that the value of the second normalized detection signal NS2 when the target position is in the middle of its movable range corresponds to zero.

A corrected position detection signal CS refers to the sum of the first corrected detection signal CS1 and the second corrected detection signal CS2.

The first corrected detection signal CS1, the second corrected detection signal CS2 and the corrected position detection signal CS are collectively referred to as corrected detection signals.

For each of the first detection signal S1, the second detection signal S2 and the position detection signal S, the degree of linearity of its variations with respect to variations in the target position is referred to as linearity of the signal.

In the present embodiment, the variable range of the first detection signal S1 corresponding to the movable range of the target position includes the first reference value, and the variable range of the second detection signal S2 corresponding to the movable range of the target position includes the second reference value. By virtue of this, the position detection device 1 according to the present embodiment achieves high linearity of the position detection signal S and is thus capable of performing position detection with high accuracy even when subjected to a noise magnetic field.

The reason why the above-described effect is obtained will now be described. First, a description will be given of the reason why the position detection device 1 according to the present embodiment achieves high linearity of the position detection signal S. The linearity of the first detection signal S1 is high at values near the first reference value, and becomes lower with increasing difference from the first reference value. Likewise, the linearity of the second detection signal S2 is high at values near the second reference value, and becomes lower with increasing difference from the second reference value. Thus, by allowing the respective variable ranges of the first detection signal S1 and the second detection signal S2 to include the first reference value and the second reference value, respectively, it is possible to enhance the linearities of the first and second detection signals S1 and S2, and as a result, it is possible to enhance the linearity of the position detection signal S.

Next, a description will be given of the reason why the position detection device 1 according to the present embodiment is capable of performing position detection with high accuracy even when subjected to a noise magnetic field. In the present embodiment, the direction of the third magnetic field component MF3 is opposite to the direction of the first magnetic field component MF1, and the direction of the fourth magnetic field component MF4 is opposite to the direction of the second magnetic field component MF2. On the other hand, a noise magnetic field applied to the first magnetic sensor 20A and a noise magnetic field applied to the second magnetic sensor 20B are in the same direction. As a result, when a noise magnetic field is applied to each of the first and second magnetic sensors 20A and 20B, one of the first and second detection signals S1 and S2 increases whereas the other decreases. According to the present embodiment, since the position detection signal S is the sum of the first detection signal S1 and the second detection signal S2, variations in the position detection signal S caused by a noise magnetic field are reduced.

Further, according to the present embodiment, since the variable range of the first detection signal S1 includes the first reference value and the variable range of the second detection signal S2 includes the second reference value, the linearities of the first and second detection signals S1 and S2 are high. This reduces the difference between the amount of increase of one of the first and second detection signals S1 and S2 and the amount of decrease of the other when a noise magnetic field is applied to each of the first and second magnetic sensors 20A and 20B. Accordingly, the embodiment achieves further reduction in variations in the position detection signal S caused by a noise magnetic field.

For the reasons described above, the position detection device 1 according to the present embodiment achieves high linearity of the position detection signal S and is capable of performing position detection with high accuracy even when subjected to a noise magnetic field.

To enhance the above-described effect, it is preferable that a value in the middle of the variable range of the first detection signal S1 be the first reference value and a value in the middle of the variable range of the second detection signal S2 be the second reference value. To achieve this, the direction of the first target magnetic field MFA when the first detection signal S1 is of the first reference value is preferably the same as one of the two directions PP1 and PP2 orthogonal to the magnetization direction of the magnetization pinned layers in the first magnetic sensor 20A. Likewise, the direction of the second target magnetic field MFB when the second detection signal S2 is of the second reference value is preferably the same as one of the two directions PP3 and PP4 orthogonal to the magnetization direction of the magnetization pinned layers in the second magnetic sensor 20B.

For the position detection device 1, even when the strengths of the first and third magnetic field components MF1 and MF3 are equal to each other in absolute value, the strengths of the second and fourth magnetic field components MF2 and MF4 corresponding to the same target position may differ from each other in absolute value due to, for example, limitations on the arrangement of the magnets 13A and 13B. FIG. 3 illustrates one example of such a case where the magnets 13A and 13B are located at different positions in the Z direction. When the strengths of the second and fourth magnetic field components MF2 and MF4 corresponding to the same target position differ from each other in absolute value as in this example, the aforementioned condition that the variable range of the first detection signal S1 includes the first reference value and the variable range of the second detection signal S2 includes the second reference value may not be met if no measures are taken.

According to the present embodiment, at least one of the first and second position detectors 1A and 1B includes the bias magnetic field generation unit for generating a bias magnetic field to be applied to the first or second magnetic sensor 20A or 20B. This enables the above-described condition to be met even when the strengths of the second and fourth magnetic field components MF2 and MF4 corresponding to the same target position differ from each other in absolute value. To be more specific, by application of a bias magnetic field to at least one of the first and second magnetic sensors 20A and 20B, at least one of the variable range of the first detection signal S1 and the variable range of the second detection signal S2 varies. This enables adjustments so that the above-described condition can be met.

First and second examples of the position detection device 1 according to the present embodiment and a position detection device of a comparative example will now be described.

First Example

Figure 11:
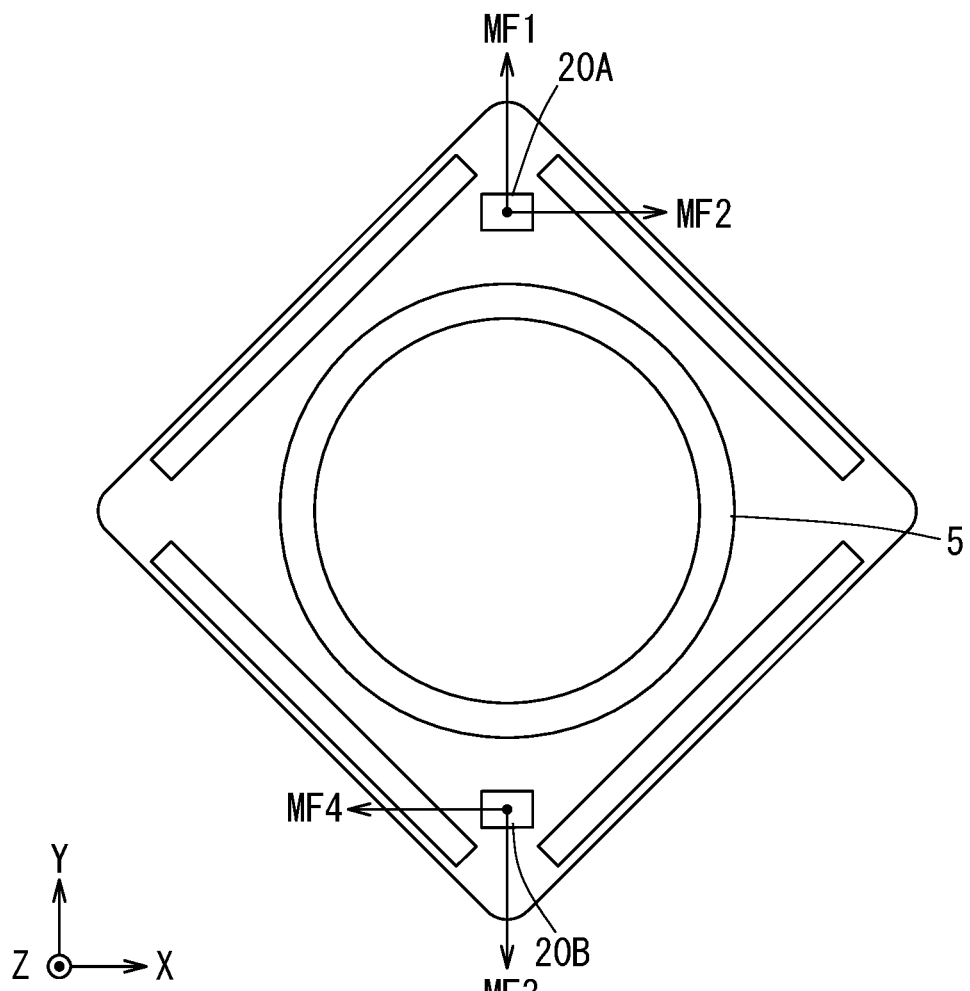
FIG. 11 is an explanatory diagram illustrating the first to fourth magnetic field components in a first example.

The first example of the position detection device 1 according to the present embodiment will be described. FIG. 11 is an explanatory diagram illustrating the first to fourth magnetic field components in the first example. In FIG. 11, the arrows labeled MF1, MF2, MF3, and MF4 indicate the directions and strengths of the first, second, third, and fourth magnetic field components, respectively. In the first example, the strengths of the first and third magnetic field components MF1 and MF3 are equal in absolute value, and the strengths of the second and fourth magnetic field components MF2 and MF4 corresponding to the same target position are equal in absolute value.

In the first example, neither of the first and second position detectors 1A and 1B includes a bias magnetic field generation unit.

In the first example, a value in the middle of the variable range of the first detection signal S1 is the first reference value, and a value in the middle of the variable range of the second detection signal S2 is the second reference value. Further, the direction of the first target magnetic field MFA when the first detection signal S1 is of the first reference value is the same as the direction PP1, which is one of the two directions PP1 and PP2 orthogonal to the magnetization direction of the magnetization pinned layers in the first magnetic sensor 20A. The direction of the second target magnetic field MFB when the second detection signal S2 is of the second reference value is the same as the direction PP3, which is one of the two directions PP3 and PP4 orthogonal to the magnetization direction of the magnetization pinned layers in the second magnetic sensor 20B.

By way of example, assume here that when the target position is in the middle of its movable range, the absolute value of the strength of the second magnetic field component MF2 is equal to the absolute value of the strength of the first magnetic field component MF1, and the absolute value of the strength of the fourth magnetic field component MF4 is equal to the absolute value of the strength of the third magnetic field component MF3. In this case, the first target magnetic field MFA is in a direction that is rotated clockwise by 45° from the Y direction, and the second target magnetic field MFB is in a direction that is rotated clockwise by 45° from the −Y direction. Thus, in this example, the magnetization direction of the magnetization pinned layers in the first magnetic sensor 20A is set so that the direction PP1 coincides with the direction rotated clockwise by 45° from the Y direction, and the magnetization direction of the magnetization pinned layers in the second magnetic sensor 20B is set so that the direction PP3 coincides with the direction rotated clockwise by 45° from the −Y direction.

Figure 12:
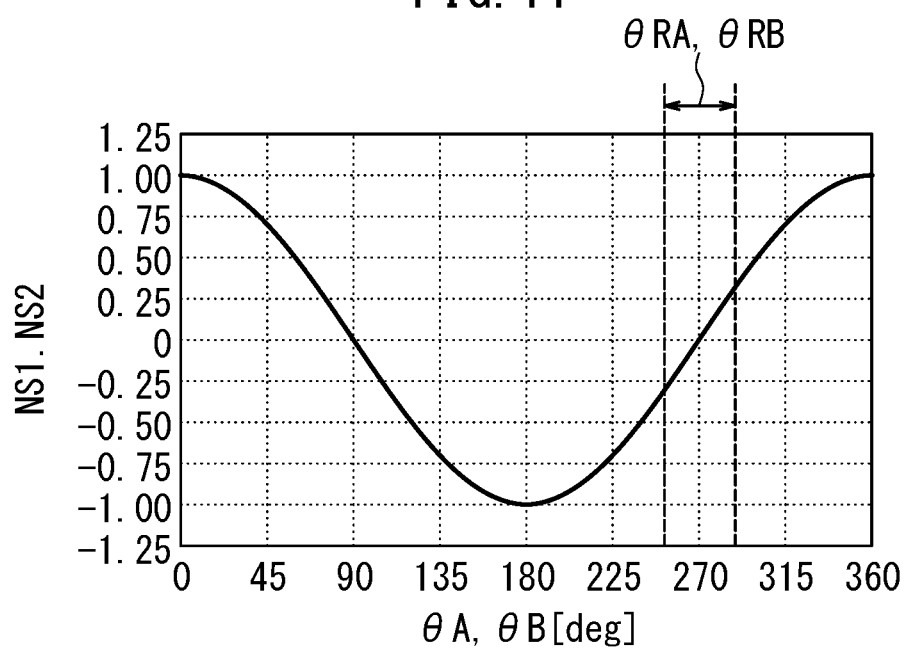
FIG. 12 is a characteristic diagram illustrating variable ranges of first and second target angles in the first example.

FIG. 12 is a characteristic diagram illustrating the variable ranges θRA and θRB of the first and second target angles θA and θB in the first example. In FIG. 12 the horizontal axis represents the first and second target angles θA and θB, and the vertical axis represents the first and second normalized detection signals NS1 and NS2. As shown in FIG. 12, both of the variable range of the first normalized detection signal NS1 corresponding to the variable range θRA and the variable range of the second normalized detection signal NS2 corresponding to the variable range θRB include zero, which corresponds to the first and second reference values. In the first example, specifically, a value in the middle of the variable range of the first normalized detection signal NS1 and a value in the middle of the variable range of the second normalized detection signal NS2 are both zero.

Figure 13:
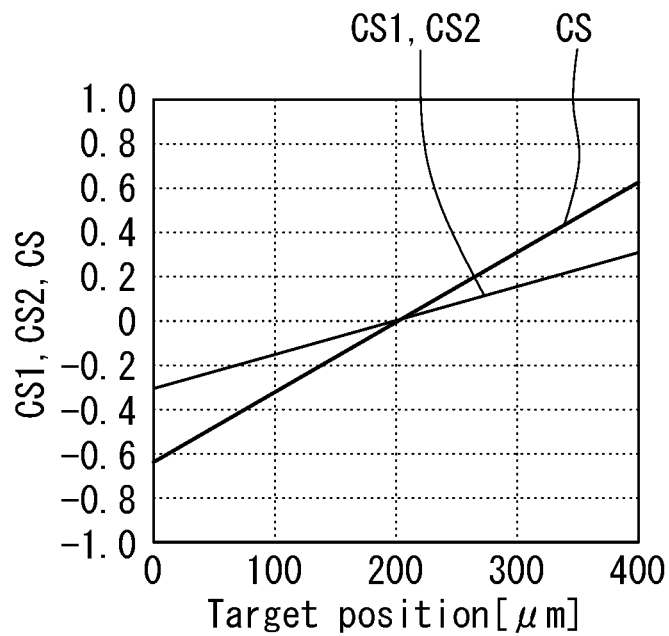
FIG. 13 is a characteristic diagram illustrating the relationship between a target position and corrected detection signals when there is no noise magnetic field in the first example.

FIG. 13 is a characteristic diagram illustrating the relationship between the target position and the corrected detection signals when there is no noise magnetic field in the first example. In FIG. 13 the horizontal axis represents the target position, and the vertical axis represents the first corrected detection signal CS1, the second corrected detection signal CS2, and the corrected position detection signal CS.

Figure 14:
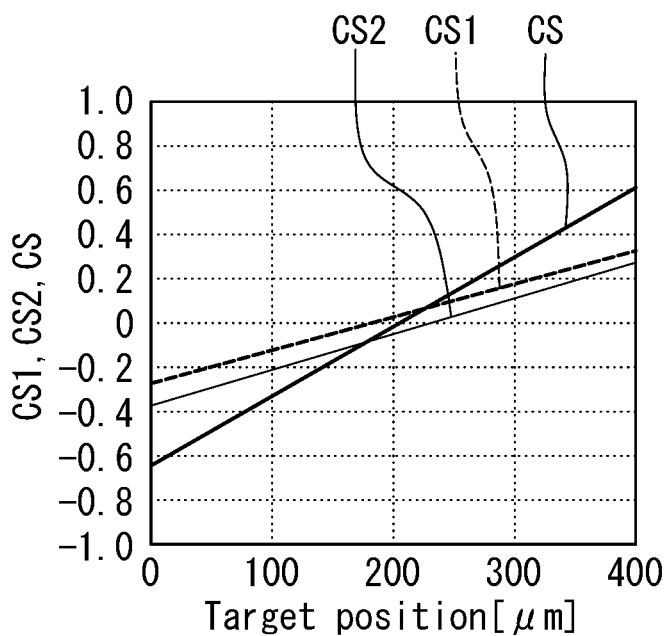
FIG. 14 is a characteristic diagram illustrating the relationship between the target position and the corrected detection signals when there is a noise magnetic field in the first example.

FIG. 14 is a characteristic diagram illustrating the relationship between the target position and the corrected detection signals when there is a noise magnetic field in the first example. In FIG. 14 the horizontal axis represents the target position, and the vertical axis represents the first corrected detection signal CS1, the second corrected detection signal CS2, and the corrected position detection signal CS. Here, the noise magnetic field is assumed to contain a component in the X direction.

Figure 15:
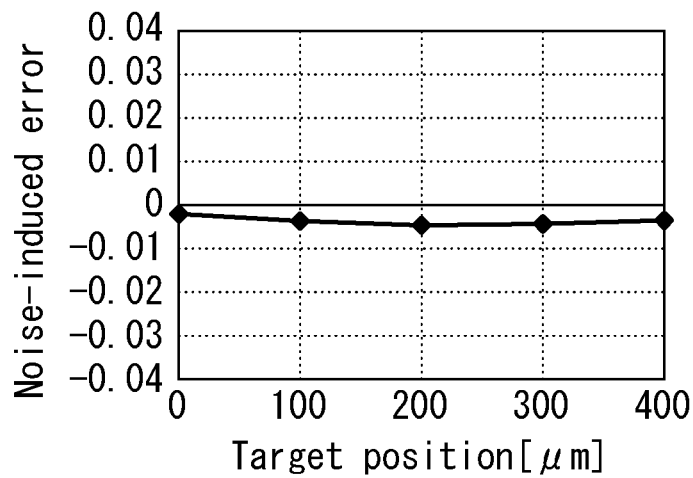
FIG. 15 is a characteristic diagram illustrating the relationship between the target position and a noise-induced error in the first example.

FIG. 15 is a characteristic diagram illustrating the relationship between the target position and a noise-induced error in the first example. The noise-induced error is a value obtained by subtracting the corrected position detection signal CS when there is no noise magnetic field from the corrected position detection signal CS when there is a noise magnetic field.

In the first example, as seen from FIGS. 13 and 14, the corrected position detection signal CS has high linearity regardless of whether a noise magnetic field is present or not. Further, as shown in FIG. 15, the noise-induced error is sufficiently small relative to the extent of the variable range of the corrected position detection signal CS corresponding to the movable range of the target position. This indicates that the first example achieves the above-described effect of the position detection device 1 according to the present embodiment.

COMPARATIVE EXAMPLE

Figure 16:
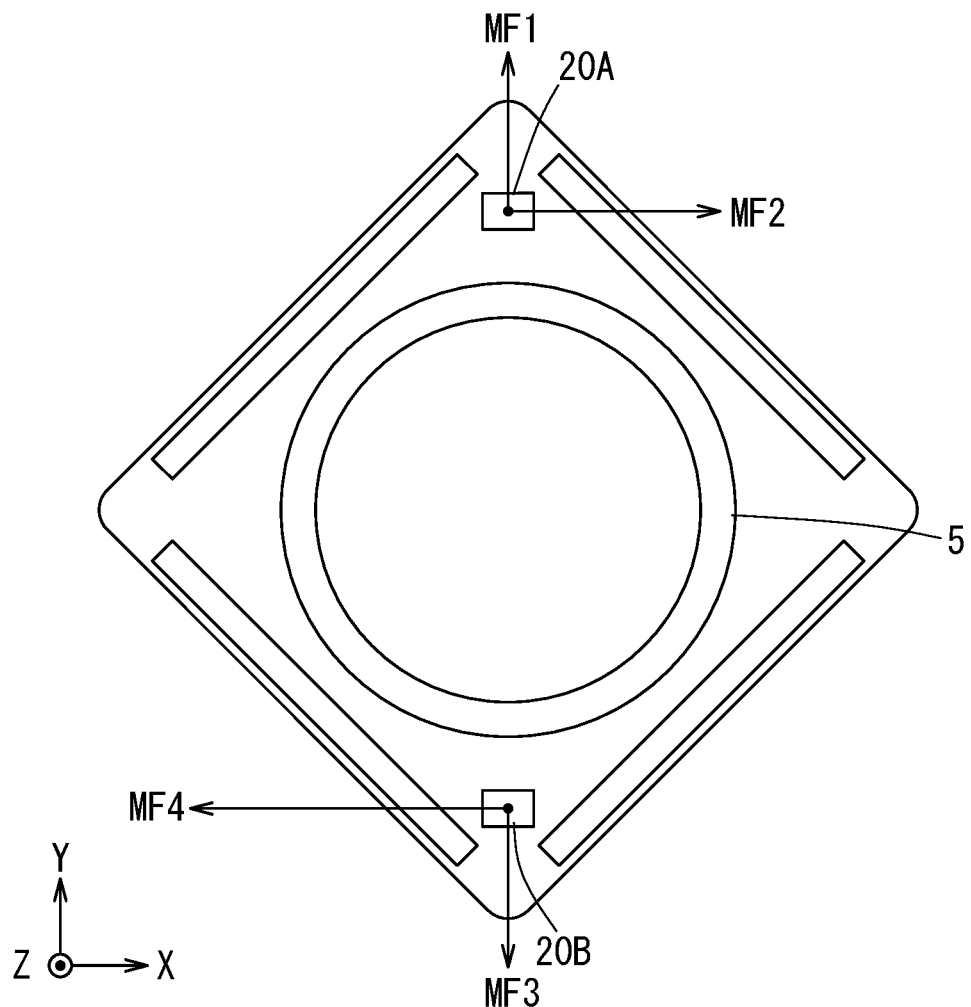
FIG. 16 is an explanatory diagram illustrating the first to fourth magnetic field components in a comparative example.

Next, a description will be given of a position detection device of a comparative example. FIG. 16 is an explanatory diagram similar to FIG. 11, illustrating the first to fourth magnetic field components MF1, MF2, MF3 and MF4 in the comparative example. In the comparative example, the absolute value of the strength of the second magnetic field component MF2 and the absolute value of the strength of the fourth magnetic field component MF4 corresponding to the same target position are larger than in the first example. Further, in the comparative example, the absolute value of the strength of the second magnetic field component MF2 and the absolute value of the strength of the fourth magnetic field component MF4 corresponding to the same target position are different from each other, the latter being larger than the former. Further, in the comparative example, neither of the first and second position detectors 1A and 1B includes the bias magnetic field generation unit. The configuration of the position detection device of the comparative example is otherwise the same as that of the first example.

Figure 17:
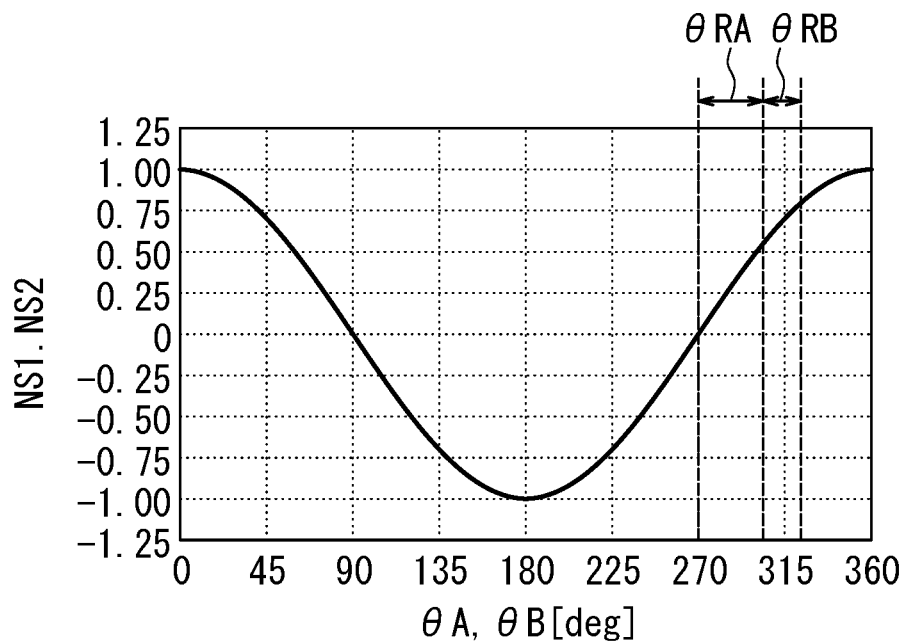
FIG. 17 is a characteristic diagram illustrating the variable ranges of the first and second target angles in the comparative example.

FIG. 17 is a characteristic diagram similar to FIG. 12, illustrating the variable ranges θRA and θRB of the first and second target angles θA and θB in the comparative example. In the comparative example, the lower limit of the variable range of the first normalized detection signal NS1 corresponding to the variable range θRA is zero. Further, the variable range of the second normalized detection signal NS2 corresponding to the variable range θRB does not include zero.

Figure 18:
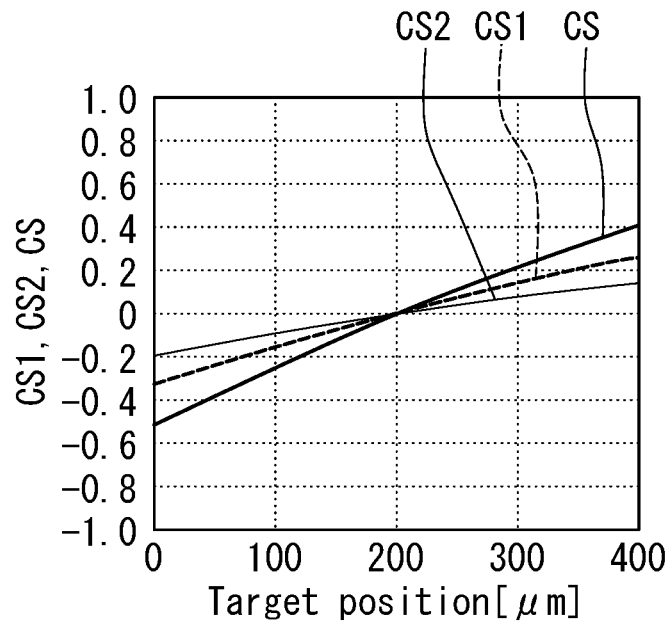
FIG. 18 is a characteristic diagram illustrating the relationship between the target position and the corrected detection signals when there is no noise magnetic field in the comparative example.

FIG. 18 is a characteristic diagram similar to FIG. 13, illustrating the relationship between the target position and the corrected detection signals when there is no noise magnetic field in the comparative example.

Figure 19:
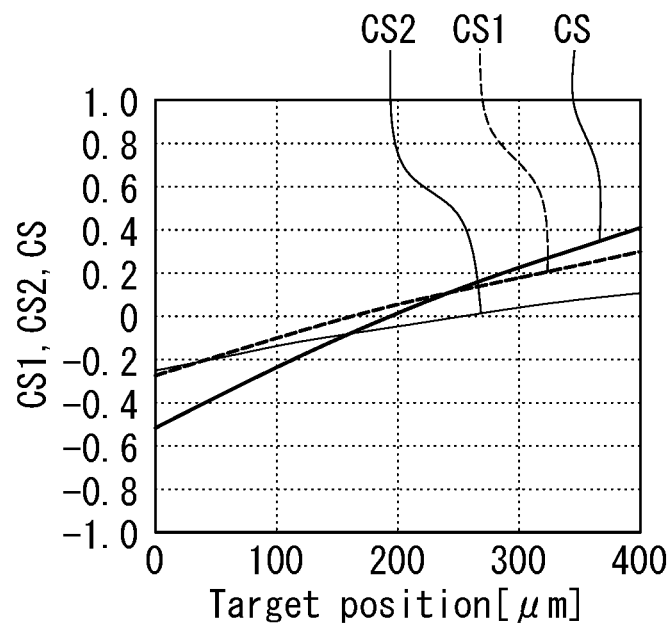
FIG. 19 is a characteristic diagram illustrating the relationship between the target position and the corrected detection signals when there is a noise magnetic field in the comparative example.

FIG. 19 is a characteristic diagram similar to FIG. 14, illustrating the relationship between the target position and the corrected detection signals when there is a noise magnetic field in the comparative example. The noise magnetic field is the same as that in the first example.

Figure 20:
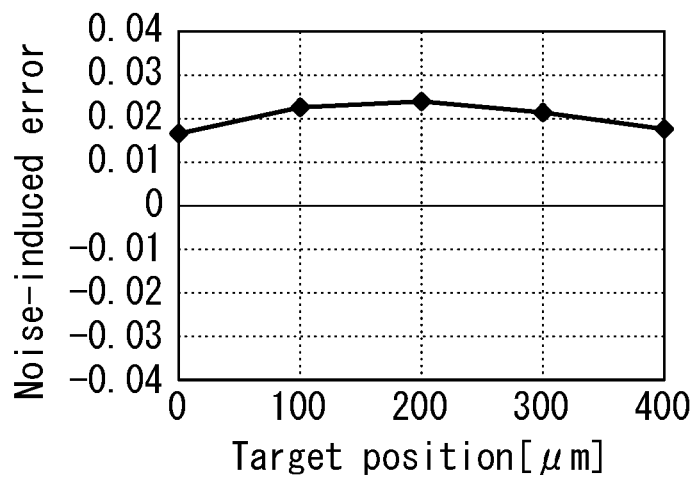
FIG. 20 is a characteristic diagram illustrating the relationship between the target position and the noise-induced error in the comparative example.

FIG. 20 is a characteristic diagram similar to FIG. 15, illustrating the relationship between the target position and the noise-induced error in the comparative example.

As shown in FIG. 20, the noise-induced error in the comparative example is larger than in the first example. The noise-induced error in the comparative example is so large that it is non-negligible relative to the extent of the variable range of the corrected position detection signal CS corresponding to the movable range of the target position. The position detection device of the comparative example is thus incapable of performing position detection with high accuracy when subjected to a noise magnetic field.

Second Example

Figure 21:
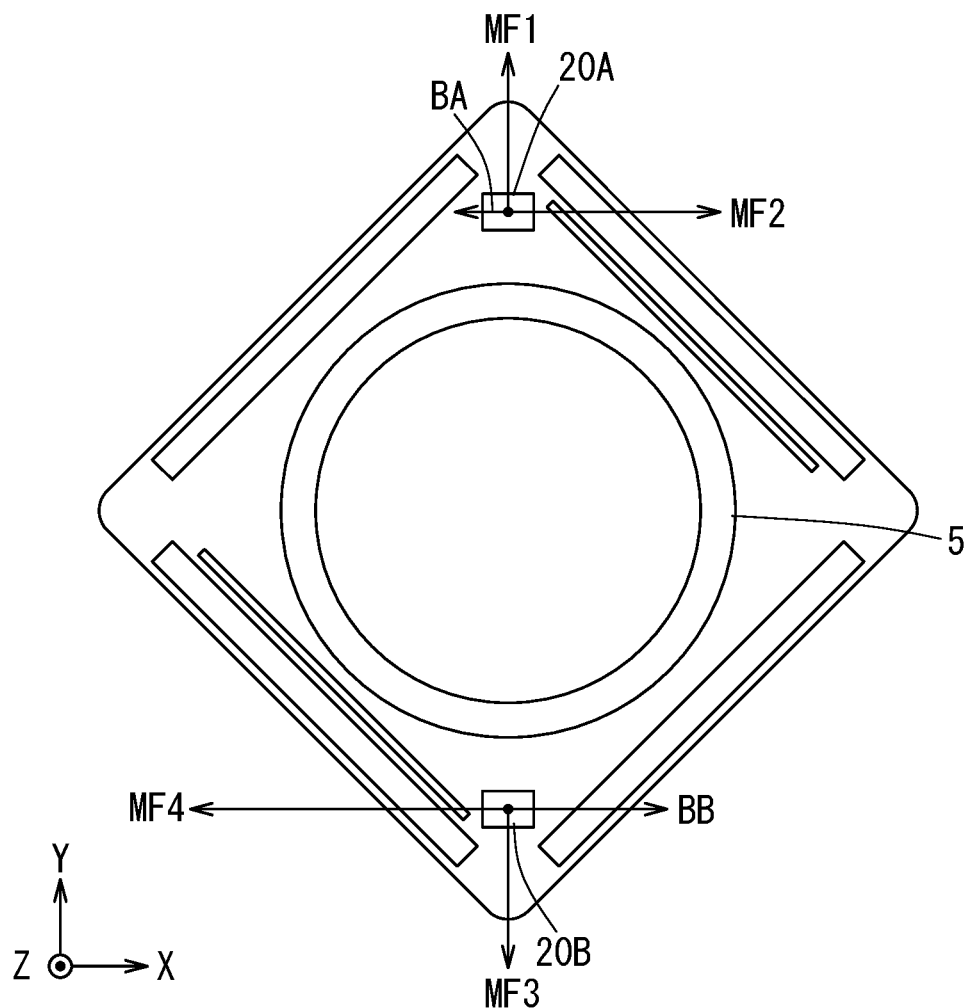
FIG. 21 is an explanatory diagram illustrating the first to fourth magnetic field components in a second example.

Next, a description will be given of a second example of the position detection device 1. FIG. 21 is an explanatory diagram similar to FIG. 11, illustrating the first to fourth magnetic field components MF1, MF2, MF3 and MF4 in the second example. The first to fourth magnetic field components MF1, MF2, MF3 and MF4 in the second example are the same as those in the comparative example.

In the second example, both of the first and second position detectors 1A and 1B include their respective bias magnetic field generation units. As shown in FIG. 21, the first bias magnetic field BA is in the −X direction. The absolute value of the strength of the first bias magnetic field BA is equal to the absolute value of the strength of the second magnetic field component MF2 of the second example minus the absolute value of the strength of the second magnetic field component MF2 of the first example. The second bias magnetic field BB is in the X direction. The absolute value of the strength of the second bias magnetic field BB is equal to the absolute value of the strength of the fourth magnetic field component MF4 of the second example minus the absolute value of the strength of the fourth magnetic field component MF4 of the first example. The absolute value of the strength of the second bias magnetic field BB is different from the absolute value of the strength of the first bias magnetic field BA. The configuration of the second example of the position detection device 1 is otherwise the same as that of the first example.

The variable ranges θRA and θRB of the first and second target angles θA and θB in the second example are the same or almost the same as the variable ranges θRA and θRB in the first example (see FIG. 12), respectively.

Figure 22:
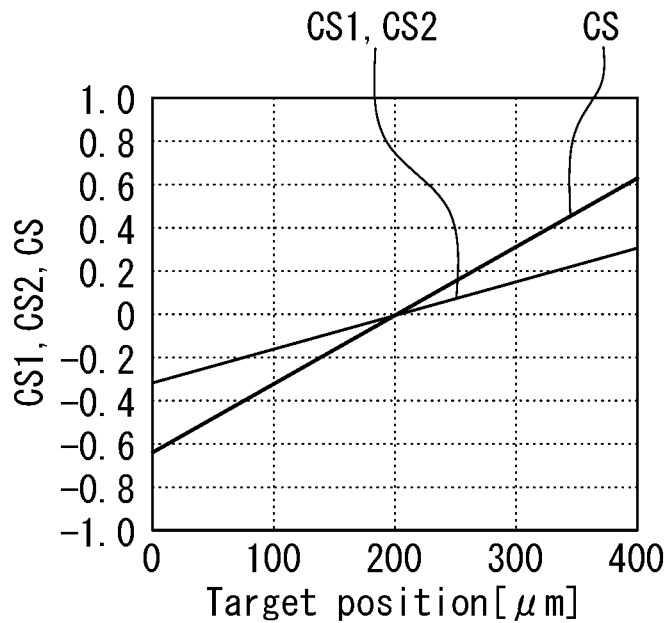
FIG. 22 is a characteristic diagram illustrating the relationship between the target position and the corrected detection signals when there is no noise magnetic field in the second example.

FIG. 22 is a characteristic diagram similar to FIG. 13, illustrating the relationship between the target position and the corrected detection signals when there is no noise magnetic field in the second example.

Figure 23:
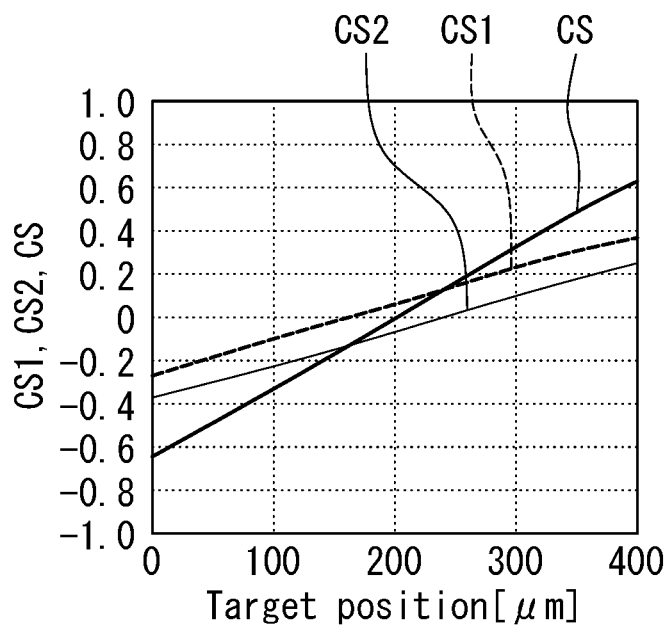
FIG. 23 is a characteristic diagram illustrating the relationship between the target position and the corrected detection signals when there is a noise magnetic field in the second example.

FIG. 23 is a characteristic diagram similar to FIG. 14, illustrating the relationship between the target position and the corrected detection signals when there is a noise magnetic field in the second example. The noise magnetic field is the same as that in the first example.

Figure 24:
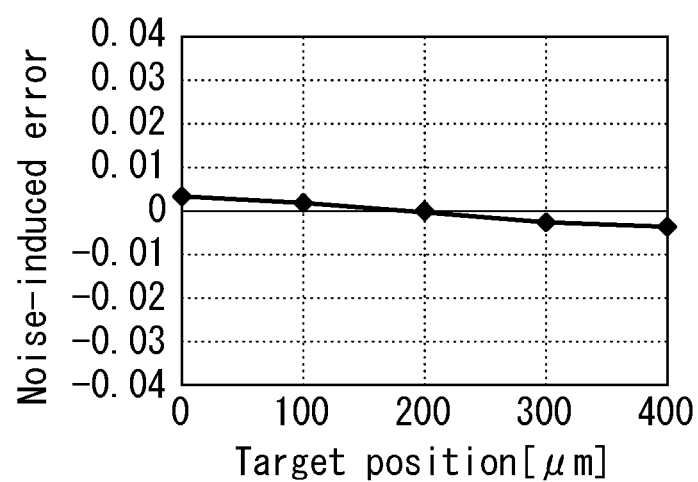
FIG. 24 is a characteristic diagram illustrating the relationship between the target position and the noise-induced error in the second example.

FIG. 24 is a characteristic diagram similar to FIG. 15, illustrating the relationship between the target position and the noise-induced error in the second example.

In the second example, as seen from FIGS. 22 and 23, the corrected position detection signal CS has high linearity regardless of whether a noise magnetic field is present or not. Further, as shown in FIG. 24, the noise-induced error is sufficiently small relative to the extent of the variable range of the corrected position detection signal CS corresponding to the movable range of the target position. This indicates that the second example achieves the above-described effect of the position detection device 1 according to the present embodiment.

Second Embodiment

A position detection device 1 according to a second embodiment of the invention will now be described. In the position detection device 1 according to the second embodiment, the first and second bias magnetic fields BA and BB are different from those in the second example of the first embodiment. In the second embodiment, the direction of the first bias magnetic field BA and the direction of the second bias magnetic field BB are non-parallel to each other.

Figure 25:
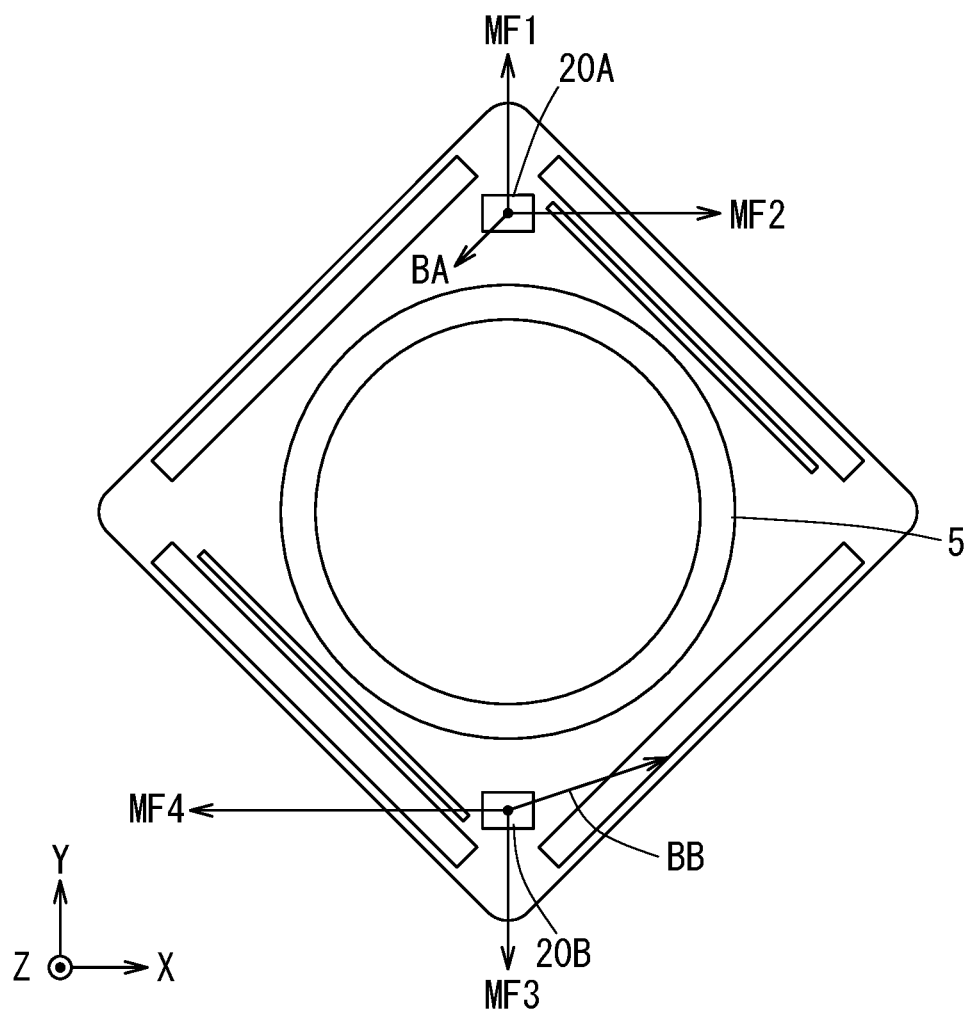
FIG. 25 is an explanatory diagram illustrating the first to fourth magnetic field components in a second embodiment of the invention.

FIG. 25 is an explanatory diagram similar to FIG. 11, illustrating the first to fourth magnetic field components MF1, MF2, MF3 and MF4 in the present embodiment. The first to fourth magnetic field components MF1, MF2, MF3 and MF4 in the present embodiment are the same as those in the second example of the first embodiment.

In the present embodiment, as shown in FIG. 25, the first bias magnetic field BA contains a component in the −X direction and a component in the −Y direction. The absolute value of the strength of the component in the −X direction of the first bias magnetic field BA is equal to the absolute value of the strength of the first bias magnetic field BA in the second example of the first embodiment.

Further, in the present embodiment, the second bias magnetic field BB contains a component in the X direction and a component in the Y direction. The absolute value of the strength of the component in the X direction of the second bias magnetic field BB is equal to the absolute value of the strength of the second bias magnetic field BB in the second example of the first embodiment.

The absolute value of the strength of the component in the Y direction of the second bias magnetic field BB is equal to the absolute value of the strength of the component in the −Y direction of the first bias magnetic field BA.

In the present embodiment, the magnetization directions of the magnetization pinned layers in the first and second magnetic sensors 20A and 20B are set in consideration of the bias magnetic fields BA and BB so that the direction PP1 will coincide with the direction of the first target magnetic field MFA when the target position is in the middle of its movable range and the direction PP3 will coincide with the direction of the second target magnetic field MFB when the target position is in the middle of its movable range.

The configuration of the position detection device 1 according to the present embodiment is otherwise the same as that of the second example of the position detection device 1 according to the first embodiment.

The variable ranges θRA and θRB of the first and second target angles θA and θB in the present embodiment may be the same or almost the same as the variable ranges θRA and θRB (see FIG. 12) in the first example of the first embodiment, respectively.

Figure 26:
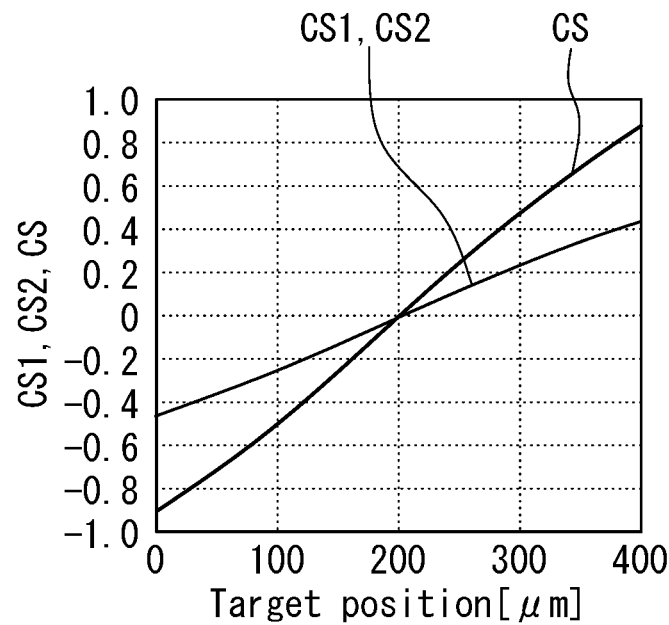
FIG. 26 is a characteristic diagram illustrating the relationship between the target position and the corrected detection signals when there is no noise magnetic field in the second embodiment of the invention.

FIG. 26 is a characteristic diagram similar to FIG. 13, illustrating the relationship between the target position and the corrected detection signals when there is no noise magnetic field in the present embodiment.

Figure 27:
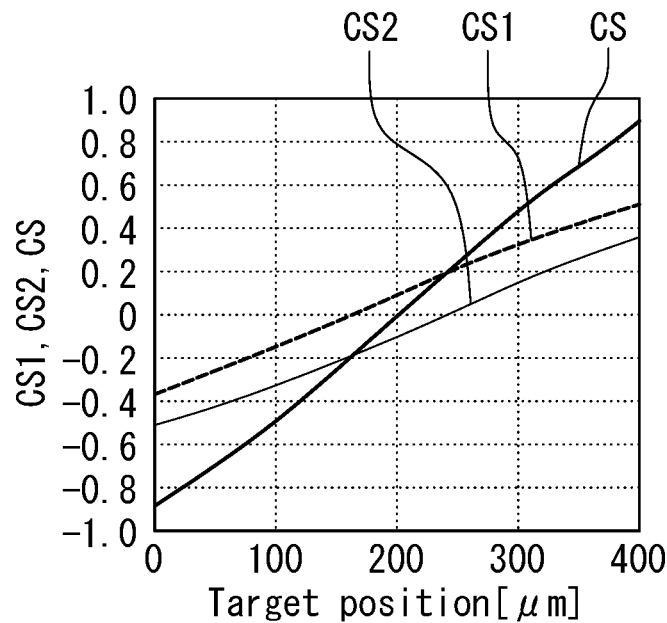
FIG. 27 is a characteristic diagram illustrating the relationship between the target position and the corrected detection signals when there is a noise magnetic field in the second embodiment of the invention.

FIG. 27 is a characteristic diagram similar to FIG. 14, illustrating the relationship between the target position and the corrected detection signals when there is a noise magnetic field in the present embodiment. The noise magnetic field is the same as that in the first example of the first embodiment.

Figure 28:
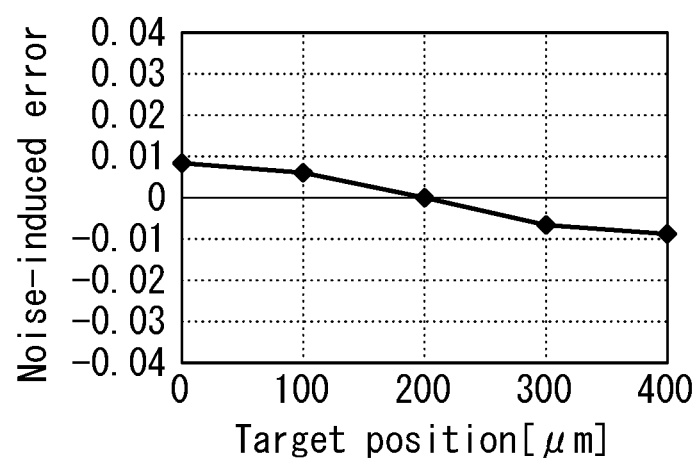
FIG. 28 is a characteristic diagram illustrating the relationship between the target position and the noise-induced error in the second embodiment of the invention.

FIG. 28 is a characteristic diagram similar to FIG. 15, illustrating the relationship between the target position and the noise-induced error in the present embodiment.

In the present embodiment, as seen from FIGS. 26 and 27, the corrected position detection signal CS has high linearity regardless of whether a noise magnetic field is present or not. Further, as shown in FIG. 28, the noise-induced error is sufficiently small relative to the extent of the variable range of the corrected position detection signal CS corresponding to the movable range of the target position. This indicates that the position detection device 1 according to the present embodiment provides the same effect as that of the position detection device 1 according to the first embodiment.

Further, as is apparent from comparison between FIGS. 13 and 26, the present embodiment shows a larger gradient of change in the corrected position detection signal CS versus the change in the target position, compared with the first example of the first embodiment. The gradient corresponds to the sensitivity of the position detection device 1. The gradient varies according to the absolute value of the strength of the component in the −Y direction of the first bias magnetic field BA and the absolute value of the strength of the component in the Y direction of the second bias magnetic field BB. According to the present embodiment, it is thus possible to adjust the sensitivity of the position detection device 1 by changing the aforementioned absolute values.

In the present embodiment, the first bias magnetic field BA may contain a component in the Y direction instead of the component in the −Y direction, and the second bias magnetic field BB may contain a component in the −Y direction instead of the component in the Y direction.

Further, in the present embodiment, the absolute value of the strength of the first magnetic field component MF1 and the absolute value of the strength of the third magnetic field component MF3 may be different from each other. In such a case, respective components in a direction parallel to the Y direction of the first and second bias magnetic fields BA and BB may be made different in strength from each other so that a composite magnetic field of the first magnetic field component MF1 and the component in the direction parallel to the Y direction of the first bias magnetic field BA and a composite magnetic field of the third magnetic field component MF3 and the component in the direction parallel to the Y direction of the second bias magnetic field BB will be in mutually opposite directions and have equal absolute values.

The configuration, operation and effects of the present embodiment are otherwise the same as those of the first embodiment.

The present invention is not limited to the foregoing embodiments, and various modifications may be made thereto. For example, as far as the requirements of the appended claims are met, the shapes and positioning of the first to fourth magnetic field generation units and the positioning of the magnetic sensors 20A and 20B are not limited to the respective examples illustrated in the foregoing embodiments, but can be freely chosen.

Further, as far as the requirements of the appended claims are met, the directions of the first to fourth magnetic field components may be freely chosen.

Further, each of the magnetic sensors 20A and 20B may be configured without the Wheatstone bridge circuit and the difference detector. For example, each of the magnetic sensors 20A and 20B may be configured to include the power supply port V, the ground port the first output port E1 and the first and second resistor sections R1 and R2, and include none of the second output port E2, the third and fourth resistor sections R3 and R4 and the difference detector 22. In such a case, each of the first and second detection signals S1 and S2 is a signal dependent on the electric potential at the first output port E1.

The position detection device of the present invention is usable to detect not only a lens position but also the position of any object moving in a predetermined direction.

Obviously, many modifications and variations of the present invention are possible in the light of the above teachings. Thus, it is to be understood that, within the scope of the appended claims and equivalents thereof, the invention may be practiced in other embodiments than the foregoing most preferable embodiments.

What is claimed is:

1. A position detection device for detecting a detection-target position that varies within a predetermined movable range, comprising:
 a first position detector;
 a second position detector; and
 a signal generator for generating a position detection signal corresponding to the detection-target position, wherein
 the first position detector includes a first magnetic field generation unit for generating a first magnetic field, a second magnetic field generation unit for generating a second magnetic field, and a first magnetic sensor,
 the second position detector includes a third magnetic field generation unit for generating a third magnetic field, a fourth magnetic field generation unit for generating a fourth magnetic field, and a second magnetic sensor,
 the first magnetic sensor is configured to detect, at a first detection position in a first reference plane, a first detection-target magnetic field and to generate a first detection signal that varies in magnitude according to a direction of the first detection-target magnetic field, wherein the first detection-target magnetic field is a magnetic field component parallel to the first reference plane,
 the second magnetic sensor is configured to detect, at a second detection position in a second reference plane, a second detection-target magnetic field and to generate a second detection signal that varies in magnitude according to a direction of the second detection-target magnetic field, wherein the second detection-target magnetic field is a magnetic field component parallel to the second reference plane,
 the signal generator generates a sum of the first detection signal and the second detection signal as the position detection signal,
 a position of the second magnetic field generation unit relative to the first magnetic field generation unit and a position of the fourth magnetic field generation unit relative to the third magnetic field generation unit vary in response to variations in the detection-target position,
 when the detection-target position varies, a strength of a second magnetic field component varies whereas none of a strength and direction of a first magnetic field component and a direction of the second magnetic field component vary, wherein the first magnetic field component is a component of the first magnetic field at the first detection position, the component of the first magnetic field being parallel to the first reference plane, and the second magnetic field component is a component of the second magnetic field at the first detection position, the component of the second magnetic field being parallel to the first reference plane,
 when the detection-target position varies, a strength of a fourth magnetic field component varies whereas none of a strength and direction of a third magnetic field component and a direction of the fourth magnetic field component vary, wherein the third magnetic field component is a component of the third magnetic field at the second detection position, the component of the third magnetic field being parallel to the second reference plane, and the fourth magnetic field component is a component of the fourth magnetic field at the second detection position, the component of the fourth magnetic field being parallel to the second reference plane,
 the direction of the third magnetic field component is opposite to the direction of the first magnetic field component,
 the direction of the fourth magnetic field component is opposite to the direction of the second magnetic field component, and
 a variable range of the first detection signal corresponding to the predetermined movable range of the detection-target position includes a first reference value, and a variable range of the second detection signal corresponding to the predetermined movable range of the detection-target position includes a second reference value, wherein the first reference value is an average value of a maximum value and a minimum value of the first detection signal when the direction of the first detection-target magnetic field varies over a range of 360°, and the second reference value is an average value of a maximum value and a minimum value of the second detection signal when the direction of the second detection-target magnetic field varies over the range of 360°.

2. The position detection device according to claim 1, wherein
- each of the first magnetic sensor and the second magnetic sensor includes at least one magnetoresistive element,
- the at least one magnetoresistive element includes a magnetization pinned layer having a magnetization whose direction is fixed, and a free layer having a magnetization whose direction is variable according to the direction of the first or second detection-target magnetic field,
- the first reference plane is a plane that contains the direction of the magnetization of the magnetization pinned layer in the first magnetic sensor and the direction of the first detection-target magnetic field,
- the direction of the first detection-target magnetic field when the first detection signal is of the first reference value is the same as one of two directions orthogonal to the direction of the magnetization of the magnetization pinned layer in the first magnetic sensor,
- the second reference plane is a plane that contains the direction of the magnetization of the magnetization pinned layer in the second magnetic sensor and the direction of the second detection-target magnetic field, and
- the direction of the second detection-target magnetic field when the second detection signal is of the second reference value is the same as one of two directions orthogonal to the direction of the magnetization of the magnetization pinned layer in the second magnetic sensor.

3. The position detection device according to claim 1, wherein a value in the middle of the variable range of the first detection signal is the first reference value, and a value in the middle of the variable range of the second detection signal is the second reference value.

4. The position detection device according to claim 1, wherein
- at least one of the first position detector and the second position detector further includes a bias magnetic field generation unit for generating a bias magnetic field to be applied to the first or second magnetic sensor, and
- the bias magnetic field applied to at least one of the first magnetic sensor and the second magnetic sensor causes the variable range of the first detection signal to include the first reference value and causes the variable range of the second detection signal to include the second reference value.

5. The position detection device according to claim 4, wherein the strength of the second magnetic field component and the strength of the fourth magnetic field component corresponding to the same detection-target position are different from each other in absolute value.

6. The position detection device according to claim 4, wherein the first position detector includes, as the bias magnetic field generation unit, a first bias magnetic field generation unit for generating a first bias magnetic field to be applied to the first magnetic sensor, and the second position detector includes, as the bias magnetic field generation unit, a second bias magnetic field generation unit for generating a second bias magnetic field to be applied to the second magnetic sensor.

7. The position detection device according to claim 6, wherein the first bias magnetic field and the second bias magnetic field are in directions non-parallel to each other.

8. The position detection device according to claim 1, wherein
- the first magnetic field generation unit includes a first magnet and a second magnet disposed at different positions,
- the first magnetic field is a composite of two magnetic fields that are respectively generated by the first magnet and the second magnet,
- the third magnetic field generation unit includes a third magnet and a fourth magnet disposed at different positions, and
- the third magnetic field is a composite of two magnetic fields that are respectively generated by the third magnet and the fourth magnet.

9. The position detection device according to claim 1, further comprising a first holding member for holding the first magnetic field generation unit and the third magnetic field generation unit, and a second holding member for holding the second magnetic field generation unit and the fourth magnetic field generation unit, the second holding member being provided such that its position is variable in one direction relative to the first holding member.

10. The position detection device according to claim 9, wherein the second holding member is configured to hold a lens, and is provided such that its position is variable in a direction of an optical axis of the lens relative to the first holding member.

* * * * *